(12) United States Patent
Altintas et al.

(10) Patent No.: US 9,355,563 B2
(45) Date of Patent: May 31, 2016

(54) WIRELESS COMMUNICATION METHOD, IN-VEHICLE WIRELESS COMMUNICATION APPARATUS, AND PROGRAM

(71) Applicants: TOYOTA INFOTECHNOLOGY CENTER CO., LTD., Tokyo (JP); KYUSHU INSTITUTE OF TECHNOLOGY, Kitakyushu-shi, Fukuoka (JP)

(72) Inventors: Onur Altintas, Tokyo (JP); Koichi Seki, Tokyo (JP); Hideaki Tanaka, Tokyo (JP); Yuji Oie, Iizuka (JP); Masato Tsuru, Iizuka (JP); Kazuya Tsukamoto, Iizuka (JP)

(73) Assignees: TOYOTA INFOTECHNOLOGY CENTER CO., LTD., Tokyo (JP); KYUSHU INSTITUTE OF TECHNOLOGY, Kitakyushu-shi (JP)

( * ) Notice: Subject to any disclaimer, the term of this patent is extended or adjusted under 35 U.S.C. 154(b) by 0 days.

(21) Appl. No.: 14/636,851

(22) Filed: Mar. 3, 2015

(65) Prior Publication Data

US 2015/0254987 A1 Sep. 10, 2015

(30) Foreign Application Priority Data

Mar. 7, 2014 (JP) ................. 2014-045212

(51) Int. Cl.
| | |
|---|---|
| G08G 1/00 | (2006.01) |
| G01C 21/34 | (2006.01) |
| H04L 27/00 | (2006.01) |
| H04W 4/04 | (2009.01) |
| H04W 88/04 | (2009.01) |
| H04W 88/18 | (2009.01) |

(52) U.S. Cl.
CPC ........ *G08G 1/22* (2013.01); *G01C 21/34* (2013.01); *H04L 27/0006* (2013.01); *H04W 4/046* (2013.01); *H04W 88/04* (2013.01); *H04W 88/182* (2013.01)

(58) Field of Classification Search
CPC ....... G08G 1/22; G01C 21/34; H04L 27/0006; H04W 4/046; H04W 88/182; H04W 88/04
USPC ........................................................... 701/49
See application file for complete search history.

(56) References Cited

U.S. PATENT DOCUMENTS

| | | | | |
|---|---|---|---|---|
| 2010/0309806 A1* | 12/2010 | Wu | ..................... | H04H 20/423 370/252 |
| 2012/0052891 A1* | 3/2012 | Irnich | ................. | H04W 52/243 455/501 |
| 2013/0150071 A1* | 6/2013 | Hassan | ............... | H04W 72/044 455/454 |
| 2014/0315565 A1* | 10/2014 | Ihara | ..................... | H04W 16/14 455/452.1 |

FOREIGN PATENT DOCUMENTS

| | | |
|---|---|---|
| JP | 2012529780 A | 11/2012 |
| WO | 2010142021 A1 | 12/2010 |

\* cited by examiner

*Primary Examiner* — Rodney Butler
*Assistant Examiner* — Anne Mazzara
(74) *Attorney, Agent, or Firm* — Oliff PLC

(57) ABSTRACT

A wireless communication method implemented by a first apparatus constituting a vehicle-to-vehicle communication system, including: receiving vehicle data transmitted on a control channel from a second apparatus; acquiring, from a map information storage unit configured to store map information divided into a plurality of first areas, information relating to a first area including a current position of the first apparatus; determining whether or not to access a DB storing WS information on the basis of position information relating to the first in-vehicle wireless communication apparatus, position information relating to another apparatus, and information relating to the first area; acquiring WS information relating to a vicinity of the current position from the DB after determining to access the DB; and transmitting the WS information acquired from the DB in the querying step to a peripheral apparatus.

15 Claims, 17 Drawing Sheets

| LATITUDE ID | LONGITUDE ID | CHANNEL ID | UTILIZATION CONDITION |
|---|---|---|---|
| 1234 | 5678 | 1 | 0 |
| 1234 | 5678 | 2 | 0 |
| 1234 | 5678 | 3 | 1 |
| ... | ... | ... | ... |

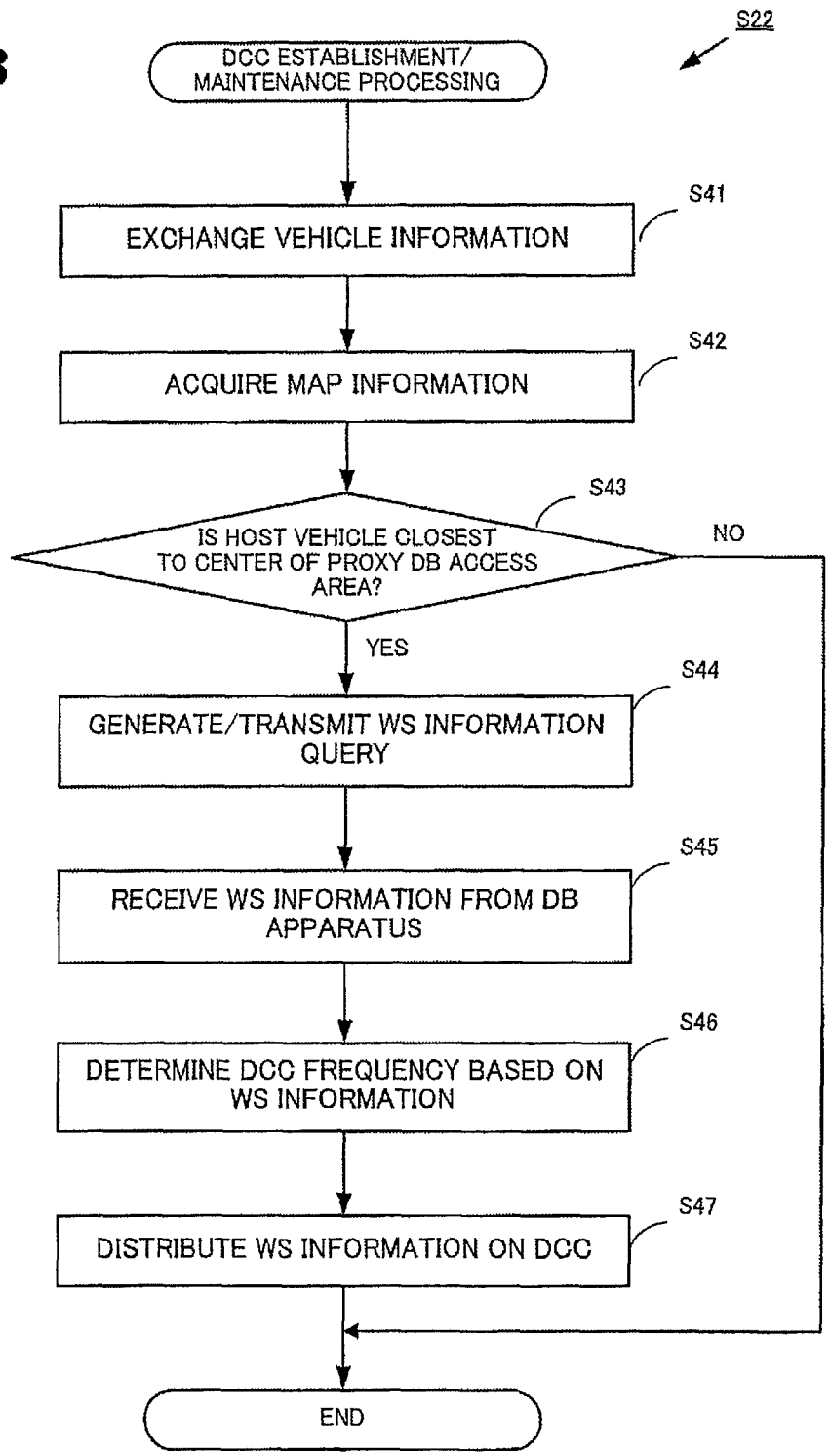

PU COVER RATIO: 25%

Ch1

PU COVER RATIO: 50%

Ch2

PU COVER RATIO: 6%

SELECT CH2 HAVING LOWEST PU COVER RATIO AS DCC

FIG. 13A
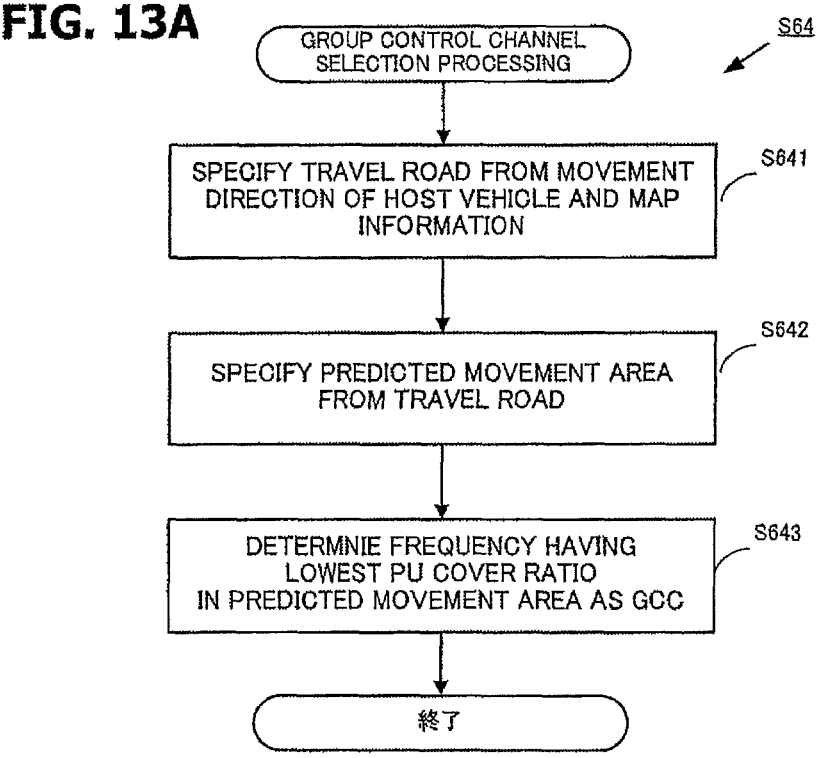
GROUP CONTROL CHANNEL SELECTION PROCESSING — S64
SPECIFY TRAVEL ROAD FROM MOVEMENT DIRECTION OF HOST VEHICLE AND MAP INFORMATION — S641
SPECIFY PREDICTED MOVEMENT AREA FROM TRAVEL ROAD — S642
DETERMNIE FREQUENCY HAVING LOWEST PU COVER RATIO IN PREDICTED MOVEMENT AREA AS GCC — S643
終了
FIG. 13B
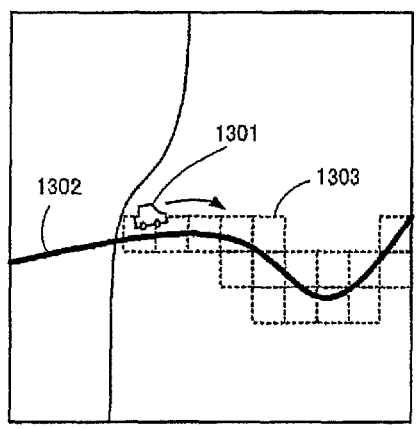
FIG. 13C
CH1: PU COVER RATIO 6%
CH2: PU COVER RATIO 50%
⇒ CH1 SELECTED AS GCC

CH1: 0 TO 5 SEC AFTER CURRENT TIME

○|○ →USABLE

CH2: 0 TO 5 SEC AFTER CURRENT TIME

×|○ →UNUSABLE

CH1: 5 TO 10 SEC AFTER CURRENT TIME

○|○ →USABLE

CH1: 5 TO 10 SEC AFTER CURRENT TIME

○|○ →USABLE

| CH \ TIME | 0 | 1 | 2 | 3 | 4 | 5 | 6 | 7 | 8 |
|---|---|---|---|---|---|---|---|---|---|
| 1 | O | O | O | O | O | O | | | O |
| 2 | | | | O | O | O | O | O | O |
| 3 | O | | O | O | O | | | | |
| 4 | O | O | O | O | | | O | O | |

SELECTED CHANNEL    Ch1

WIRELESS COMMUNICATION METHOD, IN-VEHICLE WIRELESS COMMUNICATION APPARATUS, AND PROGRAM

BACKGROUND OF THE INVENTION

1. Field of the Invention

The present invention relates to a vehicle-to-vehicle communication system for performing wireless communication using white space, and more particularly to a vehicle-to-vehicle communication system in which frequency selection is performed by acquiring white space information from a database apparatus storing the white space information.

2. Description of the Related Art

To improve the efficiency of frequency utilization, research is being undertaken into cognitive radio, in which a wireless communication apparatus recognizes and acknowledges a peripheral radio wave environment and modifies a frequency, a radio system, and so on used for wireless communication adaptively. In particular, frequencies allocated to but not actually used by a licensed user (a primary user) may be used by an unlicensed user (a secondary user). These frequencies are referred to as secondarily usable frequencies, white space, or the like. To use this white space, the secondary user must detect the usable frequencies and determine a frequency that can be used favorably.

A method of performing spectrum sensing may be employed as a method of detecting a usable frequency. By performing spectrum sensing, a frequency utilization condition in the vicinity of a current location can be ascertained. With spectrum sensing, however, the frequency utilization condition in a location apart from the current location cannot be ascertained, and therefore a mobile device must perform continuous sensing. When continuous sensing is performed, a quiet period (transmission stop period) may be provided to differentiate between primary communication and secondary communication, but as a result, a reduction in channel utilization efficiency occurs.

A method employing a white space database has been proposed as a method that avoids the problems inherent in spectrum sensing (Patent Document 1 below, for example). The white space database manages information indicating whether or not a frequency is in use by a primary user in relation to each location and each frequency. In response to an enquiry (a query) specifying position information, the white space database provides frequency information relating to the vicinity of the specified position. A mobile device such as a vehicle preferably issues a new query every time the device moves by a predetermined distance, and the Federal Communication Commission (FCC) requires that the database be accessed every 100 m. When a vehicle moves at 100 km per hour, the vehicle must access the database once every 3.6 seconds. However, this exchange is unlikely to be completed in time. Moreover, when the database is accessed from a large number of vehicles, a communication network may become congested.

CITATION LIST

Patent Document 1: Japanese Translation of PCT Application No. 2012-529780.

SUMMARY OF THE INVENTION

In consideration of the current circumstances, described above, an object of the present invention is to provide a wireless communication method with which white space information can be acquired efficiently from a white space database apparatus.

The present invention employs a configuration in which a proxy vehicle alone accesses a database apparatus (a white space database) and distributes acquired white space information to a second apparatus, instead of having respective in-vehicle wireless communication apparatuses constituting a vehicle-to-vehicle communication system access the database apparatus.

More specifically, an aspect of the present invention is a wireless communication method implemented by a first in-vehicle wireless communication apparatus constituting a vehicle-to-vehicle communication system, including: a position information acquisition step of acquiring position information relating to the first in-vehicle wireless communication apparatus; a vehicle data transmission step of transmitting vehicle data including the position information using a predetermined control channel; a vehicle data reception step of receiving vehicle data transmitted on the control channel from a second in-vehicle wireless communication apparatus; a map information acquisition step of acquiring, from a map information storage unit configured to store map information divided into a plurality of first areas (corresponding to proxy access areas), information relating to a first area including a current position; a determination step of determining whether or not to access a database apparatus storing white space information on the basis of the position information of the first in-vehicle wireless communication apparatus, acquired in the position information acquisition step, the position information of the second in-vehicle wireless communication apparatus, acquired in the vehicle data reception step, and the information relating to the first area, acquired in the map information acquisition step; a querying step of acquiring white space information relating to a vicinity of the current position from the database apparatus after determining to access the database apparatus in the determination step; and a distribution step of transmitting the white space information acquired from the database apparatus in the querying step to a peripheral in-vehicle wireless communication apparatus.

When only a part of the in-vehicle wireless communication apparatuses accesses the database apparatus and distributes the acquired white space information to the periphery, rather than having all of the in-vehicle wireless communication apparatuses access the database apparatus, access to the database apparatus can be reduced.

The algorithm employed in the determination step for determining the apparatus that accesses the database apparatus is not limited as long as only a part of the in-vehicle wireless communication apparatuses in the first area can be determined as the apparatuses that are to access the database apparatus. For example, an apparatus that is closest to a predetermined position defined within the first area (a center position of the first area, for example) is preferably determined as the apparatus that accesses the database apparatus. A plurality of in-vehicle wireless communication apparatuses in the first area may access the database apparatus, and in this case, a predetermined number of in-vehicle wireless communication apparatuses that are closest to a single predetermined position defined within the area may access the database apparatus, or the in-vehicle wireless communication apparatuses that are respectively closest to a plurality of predetermined positions defined within the area may access the database apparatus.

The aforesaid predetermined control channel may be set as a channel allocated exclusively to vehicle-to-vehicle communication, for example. By exchanging the vehicle data including the position information via this control channel, the respective in-vehicle wireless communication apparatuses can acquire the position information and so on of the in-vehicle wireless communication apparatuses existing on the periphery thereof. As a result, the respective in-vehicle wireless communication apparatuses can determine whether or not to access the database apparatus in an autonomous distributed manner.

In the present invention, a second area (corresponding to a DCC sharing area) that is larger than the first area is preferably introduced, and in the querying step, white space information relating to the second area is preferably acquired. Here, the second area may be constituted by a plurality of first areas. By enabling use of the white space information relating to the second area covering a wider range, a more appropriate frequency can be selected as a frequency used for communication. Here, a size of the first area is preferably defined as being smaller than a communication distance of the in-vehicle wireless communication apparatus, and a size of the second area is preferably defined as being larger than the communication distance of the in-vehicle wireless communication apparatus. In so doing, white space information distributed by a proxy vehicle in an adjacent first area can be received, and the white space information relating to the first area corresponding to the first in-vehicle wireless communication apparatus can be included in this distributed information from the proxy vehicle in the adjacent first area.

Furthermore, in the present invention, the subject area in which to acquire the white space information is preferably expanded on the basis of the positions, movement directions, and movement speeds of the first in-vehicle wireless communication apparatus and the peripheral in-vehicle wireless communication apparatuses. By expanding the subject area in which to acquire the white space information on the basis of the movement directions and movement speeds, white space information relating to a predicted movement range can be acquired. In other words, white space information that remains valid for a longer period can be acquired. Here, various methods may be employed to determine the expanded area. For example, the expanded area may be determined in consideration of the movement directions and movement speeds of all of the in-vehicle wireless communication apparatuses in the same first area. Alternatively, the expanded area may be determined in consideration of the movement directions and movement speeds of a part of the in-vehicle wireless communication apparatuses in the first area. Further, the expanded area may be determined in consideration of the movement direction and the movement speed of only the in-vehicle wireless communication apparatus that accesses the database apparatus. Note that in order to acquire the position information and so on of the peripheral in-vehicle wireless communication apparatuses, the respective in-vehicle wireless communication apparatuses may include the position information, movement directions, and movement speeds thereof in the transmitted vehicle data.

Moreover, in the present invention, timing of access to the database apparatus is preferably distributed in time so that the in-vehicle wireless communication apparatus does not always access the database apparatus at an identical timing. In so doing, communication collisions and excessive loads on the database apparatus are avoided. For this purpose, the timing at which the determination step (and the querying step and distribution step thereafter) is performed may be set at a timing that corresponds to the first area including the current position of the first in-vehicle wireless communication apparatus. Note that the access timing does not have to be varied among all of the first areas, and a plurality of first areas may have matching access timings.

Furthermore, in the present invention, a first dynamic control channel (corresponding to a distributed control channel) is preferably determined from usable frequencies on the basis of the white space information acquired in the manner described above. The determined first dynamic control channel is then preferably used to transmit the white space information acquired from the database apparatus to the peripheral in-vehicle wireless communication apparatuses.

Using the white space information acquired in the manner described above, the first dynamic control channel can be selected from available frequencies that are not in use by the primary user. The white space information can then be distributed using the first dynamic control channel, and as a result, a communication capacity of the predetermined control channel (a control channel used exclusively for vehicle-to-vehicle communication, for example) can be prevented from becoming overstrained.

At this time, in the first dynamic control channel determination step, a most usable frequency within the second area including the current position is preferably determined as the frequency to be used as the first dynamic control channel. As described above, the second area is larger than the first area. It is therefore likely to be possible to select a channel that can be used by a large number of the in-vehicle wireless communication apparatuses positioned in the second area as the first dynamic control channel. Further, an in-vehicle communication apparatus that determines the first dynamic control channel exists in each of the plurality of first areas included in the second area, but by selecting the first dynamic control channel in accordance with the criterion described above, an identical frequency is selected as the first dynamic control channel in the second area. As a result, frequent switching of the first dynamic control channel can be avoided.

Moreover, in the present invention, the vehicle data preferably include the position information, the movement direction, and the movement speed, and the wireless communication method preferably further includes: a group determination step of determining an in-vehicle wireless communication apparatus that belongs to an identical group to the first in-vehicle wireless communication apparatus on the basis of the position information, the movement directions, and the movement speeds of the first in-vehicle wireless communication apparatus and the second in-vehicle wireless communication apparatus; a step of determining whether or not the first in-vehicle wireless communication apparatus is a leader of the group; a second dynamic control channel determination step of determining a frequency to be used as a second dynamic control channel (corresponding to a group control channel) in the group when the first in-vehicle wireless communication apparatus is the leader of the group; and a second dynamic control channel notification step of notifying the peripheral in-vehicle wireless communication apparatus of the frequency of the second dynamic control channel using the first dynamic control channel.

At this time, in the second dynamic control channel determination step, an existence range of each in-vehicle wireless communication apparatus in the group from a current time to a predetermined time after the current time is preferably predicted on the basis of the position information, the movement directions, and the movement speeds of the in-vehicle wireless communication apparatuses in the group, and a frequency that is used least frequently by the primary user over an entire predicted range of each in-vehicle wireless communication apparatus is preferably determined as the frequency to be used as the second dynamic control channel. In so doing, a frequency having high usability within the group can be selected as the second control channel.

The present invention preferably further includes: a data channel determination step of determining a frequency to be used as a data channel in the group when the first in-vehicle wireless communication apparatus is the leader of the group; and a data channel notification step of notifying the peripheral in-vehicle wireless communication apparatus of the frequency of the data channel using the second dynamic control channel.

At this time, in the data channel determination step, an existence range according to the passage of time is preferably estimated in relation to each in-vehicle wireless communication apparatus in the group, and a frequency that can be used continuously for the longest time by all of the in-vehicle wireless communication apparatuses in the group is preferably determined as the data channel. In so doing, a frequency that can be used continuously by all of the in-vehicle wireless communication apparatuses in the group can be selected as the data channel, and as a result, stable communication can be realized.

The present invention can also be regarded as a wireless communication method including at least a part of the processing described above. Further, the present invention may be regarded as an in-vehicle wireless communication apparatus having units that execute at least a part of the processing described above, or a vehicle installed with this in-vehicle wireless communication apparatus. The present invention may also be regarded as a vehicle-to-vehicle communication system constituted by the in-vehicle wireless communication apparatuses described above. Moreover, the present invention may be regarded as a computer program that causes a computer to execute the wireless communication method described above, or a computer-readable storage medium that stores this computer program non-transitorily. The present invention may be configured by combining the units and processing described above in any possible combinations.

According to the present invention, white space information from a white space database apparatus can be acquired efficiently.

BRIEF DESCRIPTION OF THE DRAWINGS

FIG. 8 is a flowchart showing a flow of distributed control channel maintenance processing according to this embodiment;

FIG. 10 is a view illustrating distributed control channel selection processing according to this embodiment;

FIGS. 13A to 13C are flowcharts showing group control channel selection processing according to this embodiment in detail;

DESCRIPTION OF THE EMBODIMENTS

[Method of Accessing White Space Database]

Figure 1:
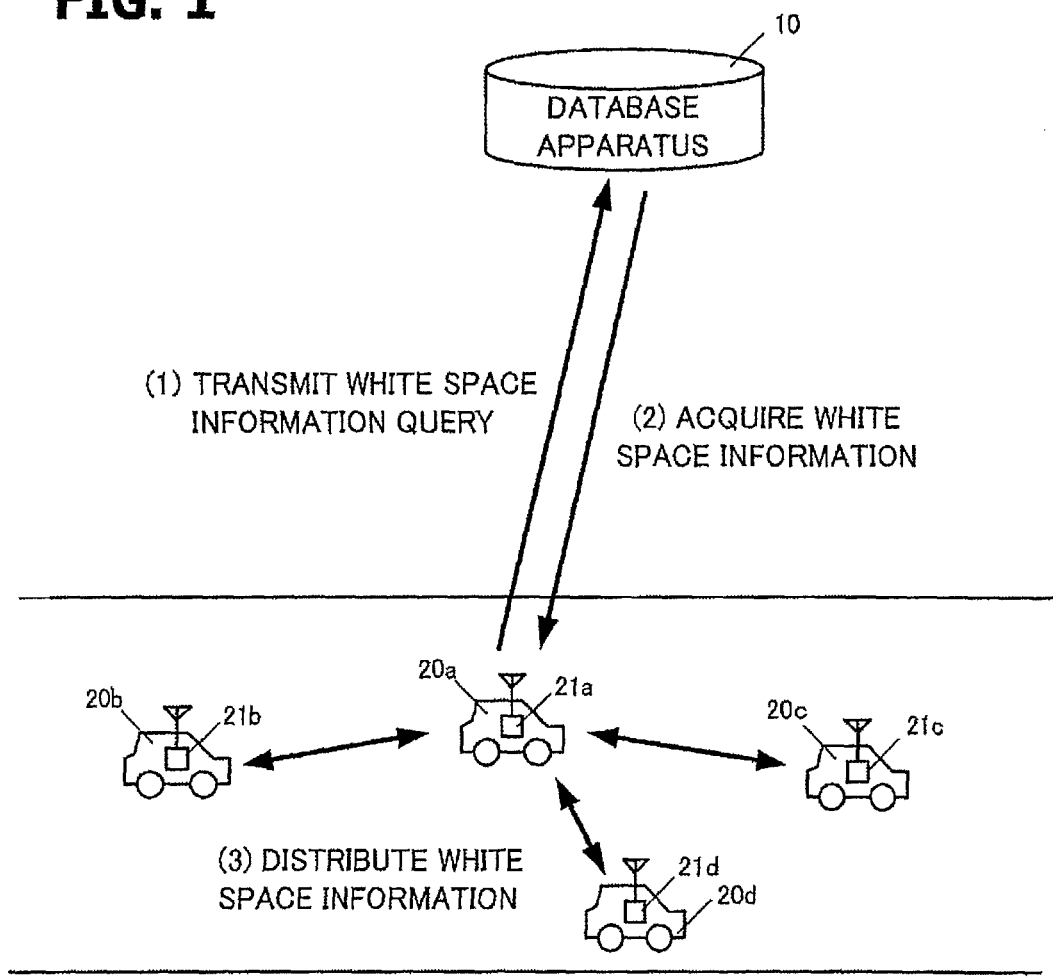
FIG. 1 is a schematic view showing a vehicle-to-vehicle communication system according to an embodiment.

FIG. 1 is a schematic view showing a vehicle-to-vehicle communication system according to an embodiment, which is constituted by a white space database apparatus 10 (also referred to hereafter as a WSDB 10 or a DB 10), and a plurality of vehicles 20a to 20d respectively installed with in-vehicle wireless communication apparatuses 21a to 21d. The vehicles of the vehicle-to-vehicle communication system according to this embodiment perform communication using a frequency (white space) that is not used by a primary user (a PU, a licensed user) as a secondary user (an SU).

Figures 2A, 2B:
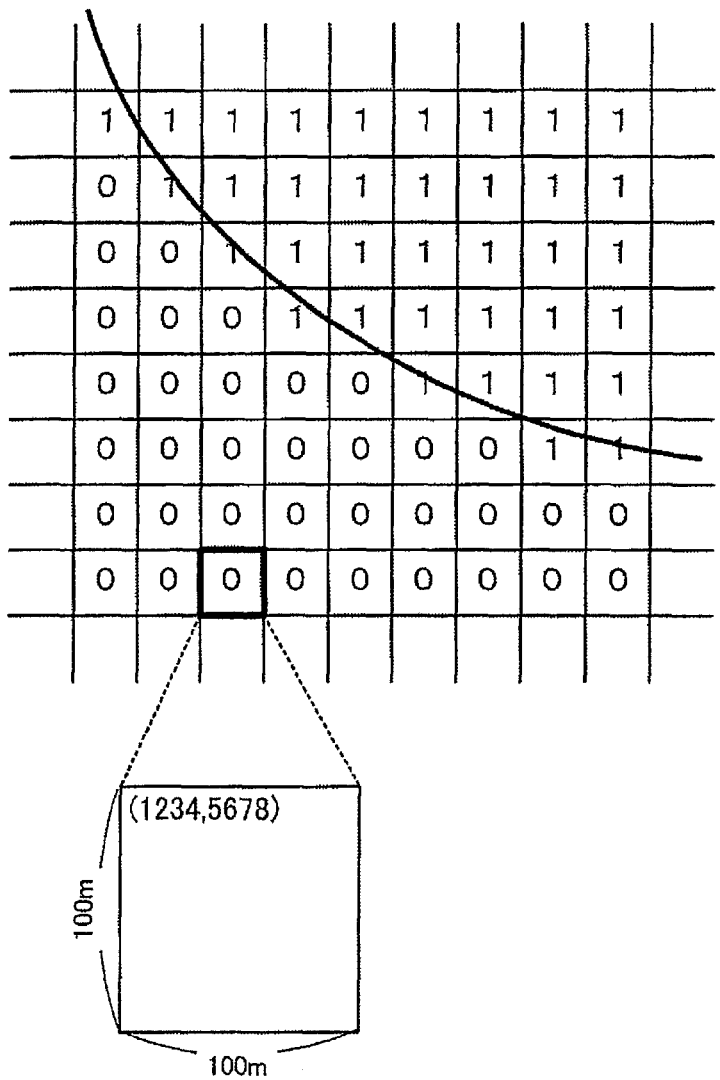
FIGS. 2A and 2B are views illustrating white space information.

FIGS. 2A and 2B are views illustrating white space information (also referred to as WS information hereafter) held in the WSDB 10. As shown in FIG. 2A, utilization conditions of the primary user are stored in the WSDB 10 in cells of a predetermined size (100 m×100 m squares, for example). As shown in FIG. 2B, each cell can be specified by a latitude ID and a longitude ID, for example, and either "1" or "0" is stored in each cell to indicate the utilization condition of the primary user in relation to each channel (i.e. whether or not the channel is in use). For example, "1" indicates that a channel is in use by the primary user, and "0" indicates that the channel is not in use. The vehicle can ascertain the channel conditions of cells in a predetermined range by obtaining the utilization condition of each channel within the range.

In this embodiment, white space is detected by accessing the WSDB 10. However, when all of the vehicles access the WSDB 10, a processing load exerted on the WSDB 10 may become excessive, and communication may become congested. Hence, in this embodiment, only a specific vehicle among the plurality of vehicles 20a to 20d accesses the WSDB 10. The vehicle that accesses the WSDB 10 distributes acquired white space information to peripheral vehicles. As a result, all of the vehicles can use the white space information while avoiding concentrated access.

Figure 3:
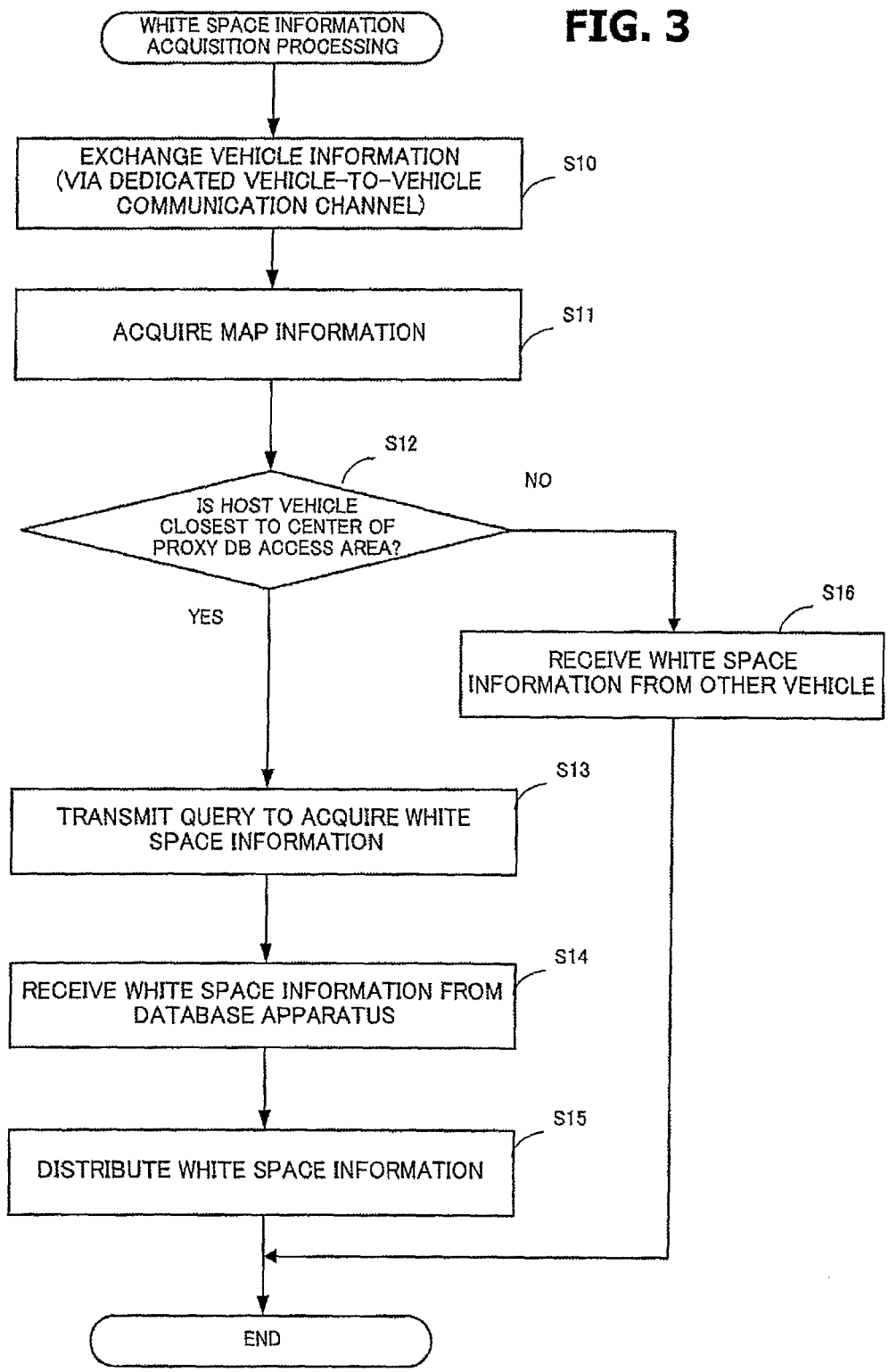
FIG. 3 is a flowchart showing a flow of white space information acquisition processing according to this embodiment.

A method of accessing the WSDB 10 (WS information acquisition processing) according to this embodiment will now be described with reference to FIG. 3. Each vehicle transmits vehicle information (a vehicle ID, position information, a movement direction, a movement speed, and so on) and receives vehicle information transmitted from the other vehicles periodically using a frequency allocated exclusively to vehicle-to-vehicle communication, such as the 760 MHz band or the 5.8 GHz band (S10). By exchanging (transmitting and receiving) the vehicle information periodically in this manner, the respective vehicles can acquire the position information of the vehicles existing on the periphery thereof. Note that in FIG. 3, vehicle information exchange is shown as being performed only once, but the vehicle information is preferably exchanged periodically, as described above.

Figure 4:
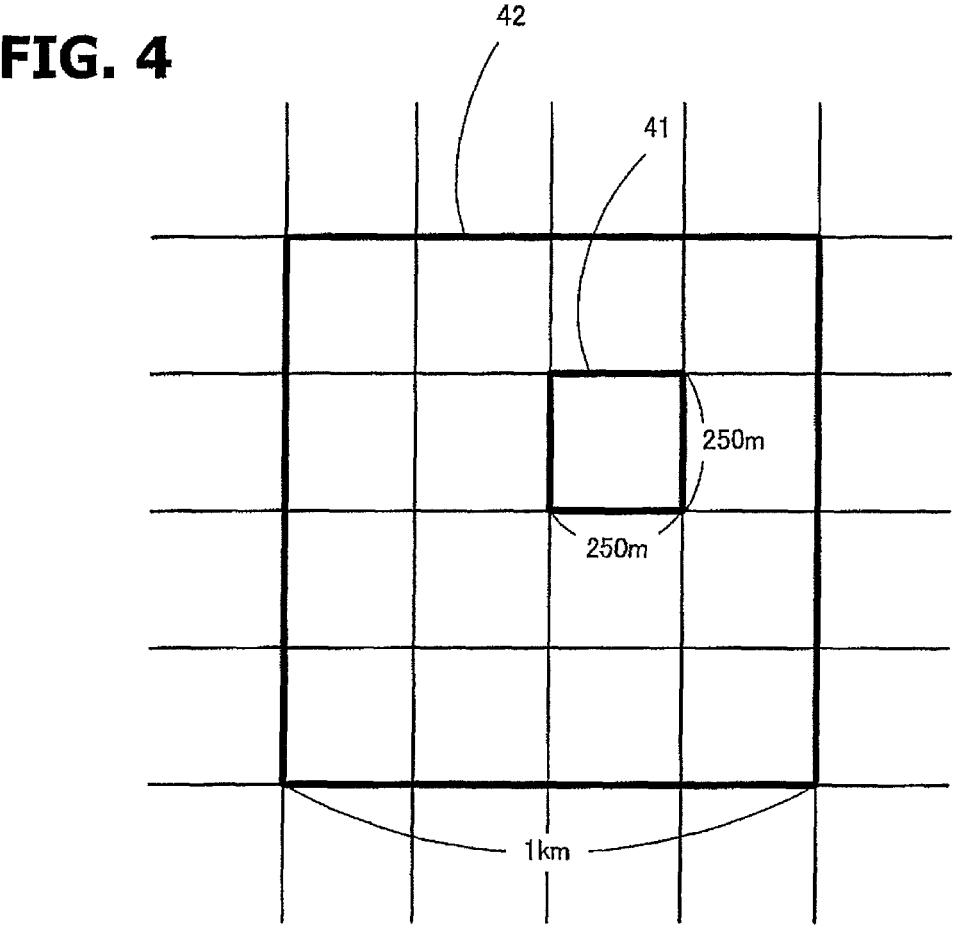
FIG. 4 is a view illustrating a proxy access area and a distributed control channel (DCC) sharing area.

In this embodiment, a single vehicle in an area call a proxy access area (corresponding to a first area) accesses the WSDB 10. As shown in FIG. 4, for example, the proxy access area may be set as an area 41 of 250 m×250 m. A criterion by which each vehicle can determine whether or not to access the WSDB 10 autonomously is preferably provided so that only a part of the vehicles in the proxy access area accesses the WSDB 10. In this embodiment, the vehicle that is closest to a predetermined position defined in the area (a center position of the area, for example), among the vehicles positioned within the same proxy access area, accesses the WSDB 10.

This will now be described more specifically. Note that the following description focuses on one vehicle within the system. The focus vehicle will be referred to as a first vehicle, and vehicles other than the first vehicle will be referred to as second vehicles. The first vehicle acquires information relating to the proxy access area by acquiring map information relating to the vicinity of the current position of the first vehicle (S11). The first vehicle then determines whether or not it is the closest vehicle to the predetermined position (the center position) of the proxy access area on the basis of the position information relating to the peripheral vehicles, acquired in step S10, the position information relating to the first vehicle, and information relating to the proxy access area, which is stored in association with the map information (S12).

When the first vehicle determines that it is the closest vehicle to the center position of the proxy access area (S12—YES), the first vehicle transmits a query to the WSDB 10 in order to acquire the white space information (S13). Here, the white space information may be acquired in relation to any desired range. As shown in FIG. 4, for example, the white space information may be acquired in relation to an area 42 (a DCC sharing area, corresponding to a second area) constituted by 4×4 proxy access areas: As will be described below, this area 42 is an area in which a shared control channel (a distributed control channel; a DCC) is used to perform communication using white space.

After obtaining a response including the white space information from the WSDB 10 (S14), the first vehicle distributes the acquired white space information to the peripheral vehicles (the second vehicles) (S15). Any desired method may be used to distribute the white space information. In a preferred method, for example, a control channel (the aforesaid DCC) is determined from the white space, and the white space information is transmitted on the determined control channel. A communication method will be described more specifically below.

When the first vehicle is not the closest vehicle to the center position of the proxy access area (S12—NO), on the other hand, the first vehicle does not access the WSDB 10, and instead receives white space information transmitted from another vehicle (S16).

By ensuring that only a part of the vehicles within the vehicle-to-vehicle communication system accesses the WSDB 10 in this manner, concentrated access to the WSDB 10 and communication network congestion can be avoided. In the example of FIG. 1, only the vehicle 20a, among the four vehicles 20a to 20d, accesses the WSDB 10, and therefore the vehicles 20b to 20d acquire the white space information from the vehicle 20a through vehicle-to-vehicle communication.

[White Space Database Assisted Vehicle-to-Vehicle Communication System]

A vehicle-to-vehicle communication system employing the white space database access method described above will now be described. In this vehicle-to-vehicle communication system, vehicle-to-vehicle communication is performed by establishing two dynamic control channels (the distributed control channel DCC and a group control channel GCC) and one or a plurality of data channels in addition to the 760 MHz (or 5.8 GHz) dedicated vehicle-to-vehicle communication channel. A dynamic control channel is a control channel on which a used frequency is determined according to frequency utilization conditions of peripheral primary users, rather than being determined in advance. Note that the 760 MHz (or 5.8 GHz) channel used exclusively for vehicle-to-vehicle communication corresponds to a predetermined control channel according to the present invention. Further, the distributed control channel DCC and the group control channel GCC correspond respectively to a first dynamic control channel and a second dynamic control channel according to the present invention.

Figure 5:
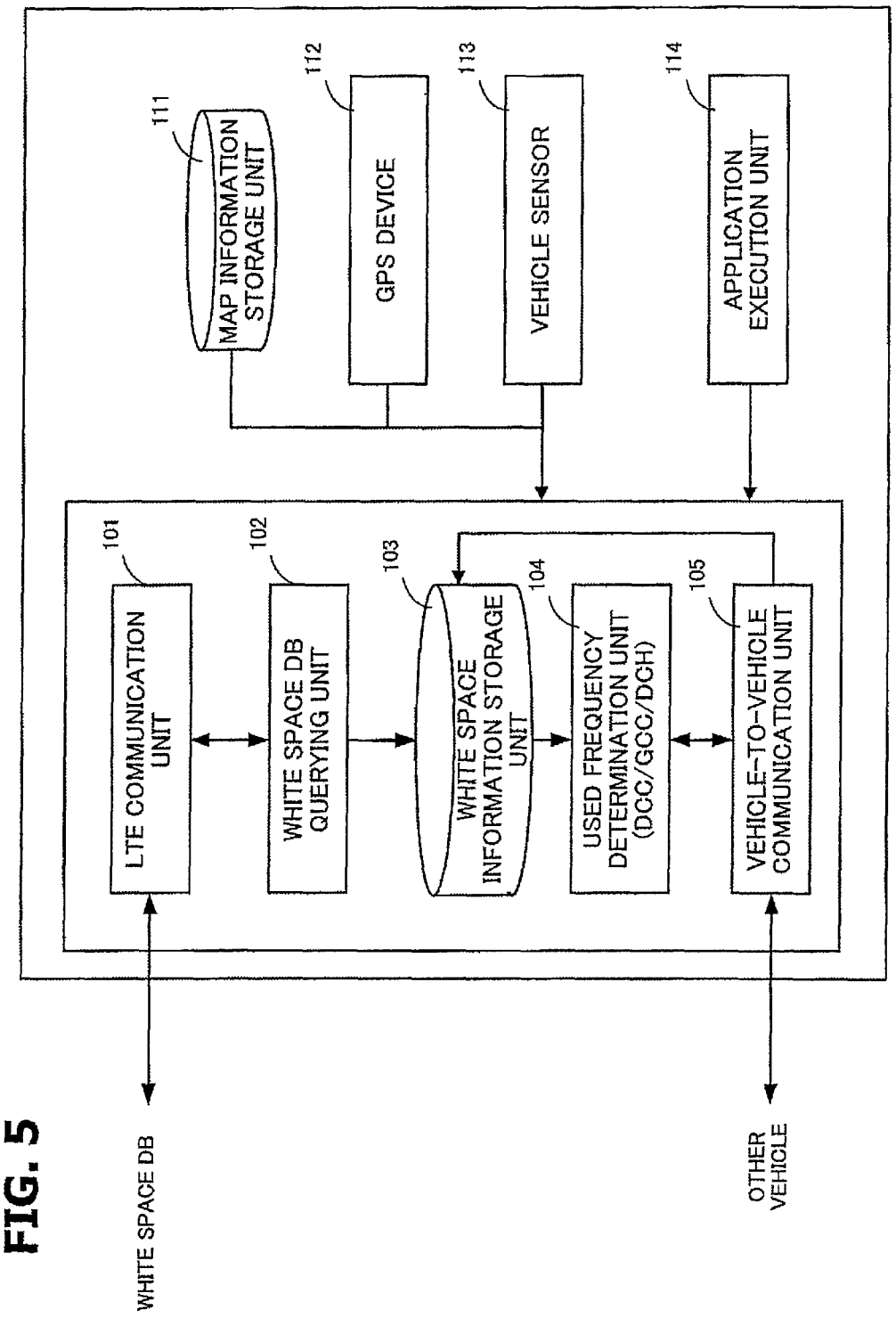
FIG. 5 is a block diagram showing a functional configuration of an in-vehicle wireless communication apparatus according to this embodiment.

FIG. 5 is a view showing function blocks of a vehicle, which together constitute a vehicle-to-vehicle communication apparatus according to this embodiment. The vehicle includes function units such as an LTE communication unit 101, a WSDB querying unit 102, a WS information storage unit 103, a used frequency determination unit 104, a vehicle-to-vehicle communication unit 105, a map information storage unit 111, a GPS apparatus 112, a vehicle sensor 113, and an application execution unit 114. These function units may be realized by hardware circuits such as electric circuits or electronic circuits, or may be realized by having a central processor unit (CPU), a micro processor unit (MPU), a digital signal processor (DSP), a field programmable gate array (FPGA), or the like execute a program stored in a storage apparatus such as a memory.

The LTE communication unit 101 performs wireless communication with the WSDB 10 via a long term evolution (LTE) communication network. Note that 3G or mobile WiMax (IEEE802.16e) may be used instead of LTE as the method of communicating wirelessly with the WSDB 10. Alternatively, a wireless LAN (IEEE802.11a/b/g/n and so on) or the like may be used.

The WSDB querying unit, 102 is a function unit that issues a query requesting WS information to the WSDB 10. The WSDB querying unit 102 performs processing such as determining whether or not to access the WSDB 10, determining a timing at which to access the WSDB 10, determining a subject range in which to acquire the WS information, and receiving a response result from the WSDB 10. This processing will be described in detail below.

The white space information storage unit 103 is a function unit that stores WS information acquired by the vehicle installed with the vehicle-to-vehicle communication apparatus from the WSDB 10 via the LTE network, and WS information acquired from another vehicle through vehicle-to-vehicle communication. As shown in FIG. 2B, the WS information storage unit 103 stores information indicating use by the primary user in relation to each cell and each channel.

The used frequency determination unit 104 is a function unit that determines frequencies to be used as the distributed control channel DCC, the group control channel GCC, and the data channel DCH. The used frequency determination unit 104 determines these channels on the basis of the WS information stored in the WS information storage unit 103, obtains the control channels on the basis of information provided by another vehicle through vehicle-to-vehicle communication, or discovers the control channels through frequency scanning (listening). A method of determining the respective channels will be described in detail below.

The vehicle-to-vehicle communication unit 105 is a function unit that performs wireless communication with a peripheral vehicle using the dedicated vehicle-to-vehicle communication channel (the 760 MHz band or the 5.8 GHz band) and a channel in white space. On the dedicated vehicle-to-vehicle communication channel, the vehicle-to-vehicle communication unit 105 transmits vehicle data such as the vehicle ID, the position information, the movement speed, and the movement direction periodically. On the distributed control channel DCC, the vehicle-to-vehicle communication unit 105 gives notice of the WS information and the frequency of the group control channel GCC. Further, on the group control channel GCC, the vehicle-to-vehicle communication unit 105 exchanges routing information within a group and gives notice of the frequency of the data channel. This will be described in detail below.

The map information storage unit 111 stores the map information. As shown in FIG. 4, the map information is divided into mesh-form proxy access areas 41 and DCC sharing areas 42. The proxy access area 41 is a 250 m×250 m square-shaped area, for example. The size of the proxy access area 41 may be set as desired, but is preferably defined in consideration of a communication distance on the 700 MHz band and the distributed control channel. The DCC sharing area 42 is a larger area than the proxy access area 41, and is constituted by a plurality of proxy access areas 41. In the example of FIG. 4, the DCC sharing area 42 is a 1 km×1 km square-shaped area constituted by 4×4 proxy access areas. As will be described below, the distributed control channel DCC is selected within the same DCC sharing area 42 in accordance with a sharing criterion. Hence, a single distributed control channel DCC is used in the same DCC sharing area, and therefore frequent modification of the distributed control channel DCC can be avoided.

The GPS apparatus 112 is an apparatus that acquires position information from a GPS apparatus. Note that as long as the position information can be acquired, a satellite positioning apparatus other than a GPS apparatus, or a base station positioning apparatus or the like, may be used. The vehicle sensor 113 is a function unit that acquires various sensor information from a vehicle control apparatus, for example a speed, an acceleration, a steering angle, a brake depression amount, and so on.

The application execution unit 114 is a function unit that executes an application program that uses vehicle-to-vehicle communication. Any program may be executed, and in the present invention there are no particular limitations thereon.

[Overall Processing]

Figure 6:
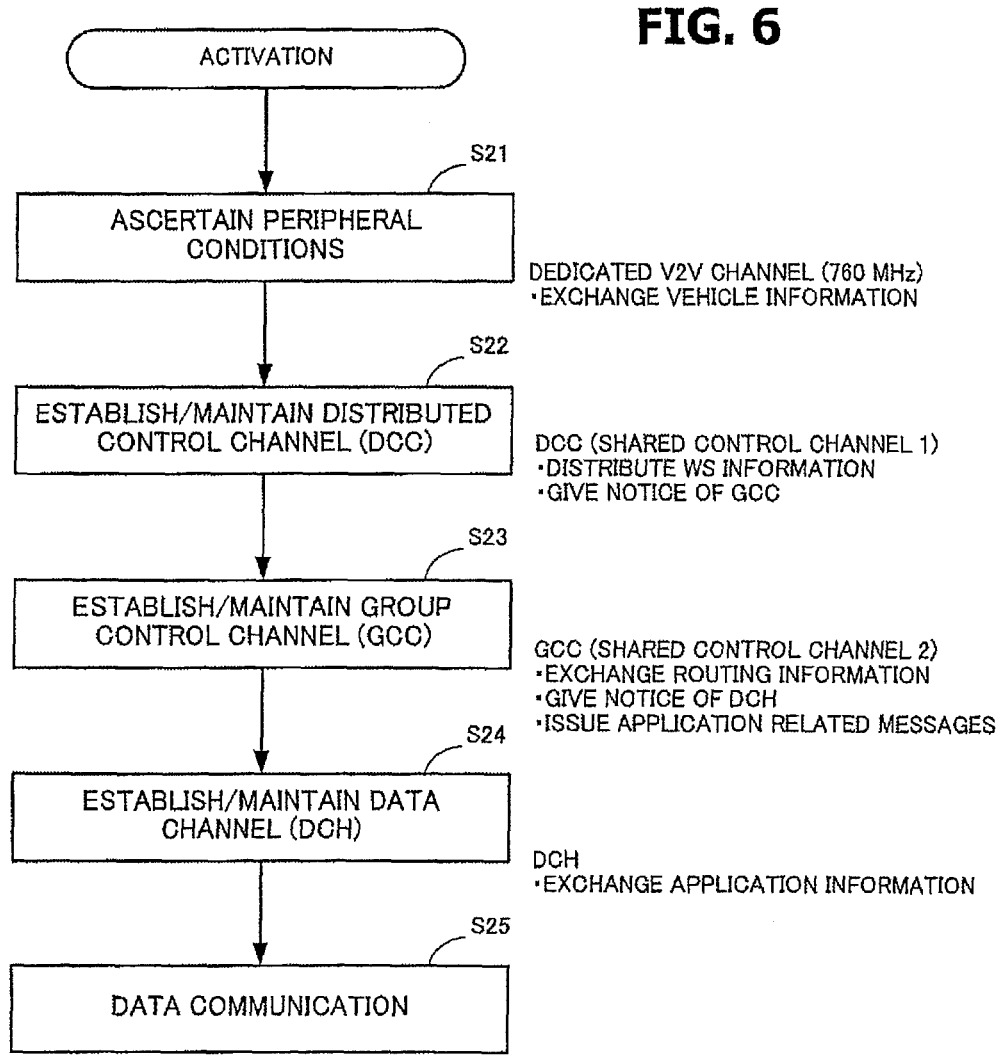
FIG. 6 is a view illustrating an overall outline of a wireless communication method according to this embodiment.

An outline of the wireless communication processing that is executed in the vehicle-to-vehicle communication system according to this embodiment will now be described with reference to a flowchart shown in FIG. 6. It should be noted that the flowchart in FIG. 6 illustrates an outline of the processing, which differs from actual processing procedures.

First, each vehicle ascertains peripheral conditions by exchanging (transmitting and receiving) vehicle information with the peripheral vehicles using the 760 MHz (or 5.8 GHz) band dedicated vehicle-to-vehicle communication channel (S21). In other words, each vehicle ascertains the number of vehicles existing on the periphery thereof, the positions of the peripheral vehicles, and so on. This vehicle information exchange processing is preferably performed periodically. For example, each vehicle may broadcast the vehicle information once every 100 milliseconds. As a result, the vehicles can ascertain the peripheral conditions at all times. Further, the vehicles acquire information relating to white space on the periphery thereof by acquiring the white space information from the WSDB 10 or a peripheral vehicle.

When the vehicle information has been received and the peripheral conditions have been ascertained, the distributed control channel DCC is established (S22). The distributed control channel DCC may be established using a method of selecting a DCC on the basis of the WS information acquired from the WSDB 10, or discovering the distributed control channel DCC by scanning the frequency band. As described above, an identical frequency is used as the distributed control channel DCC in the DCC sharing area.

Next, in group control channel GCC establishment processing S23, the group control channel GCC is established for each group (a group of vehicles, a swarm). A group is defined as vehicles having similar (movement directions and movement speeds). A specific vehicle (a leader vehicle) in the group selects the group control channel GCC and notifies the other vehicles in the group of the group control channel GCC via the distributed control channel DCC. Routing information within the group, the frequency of the data channel, messages relating to the application, and so on are transmitted on the established group control channel GCC.

Further, in data channel establishment processing S24, a data channel used for data communication within the group is established. A specific vehicle (the leader vehicle) in the group selects the data channel and notifies the other vehicles in the group of the data channel via the group control channel GCC.

When the data channel is established, the vehicles in the group perform vehicle-to-vehicle communication using the data channel (S25).

Note that in the flowchart of FIG. 6, the processing described above is shown to be performed sequentially, but the processing procedures do not necessarily have to be performed sequentially. As described above, the vehicle information is exchanged periodically. Moreover, after the various channels have been established, determinations continue to be made as to whether or not the channels remain usable, and when it becomes necessary to modify a channel frequency, channel modification processing (reestablishment processing) is performed. This processing will be described in detail below.

[Peripheral Condition Ascertaining Processing to Distributed Control Channel Establishment/Maintenance Processing]

Figure 7:
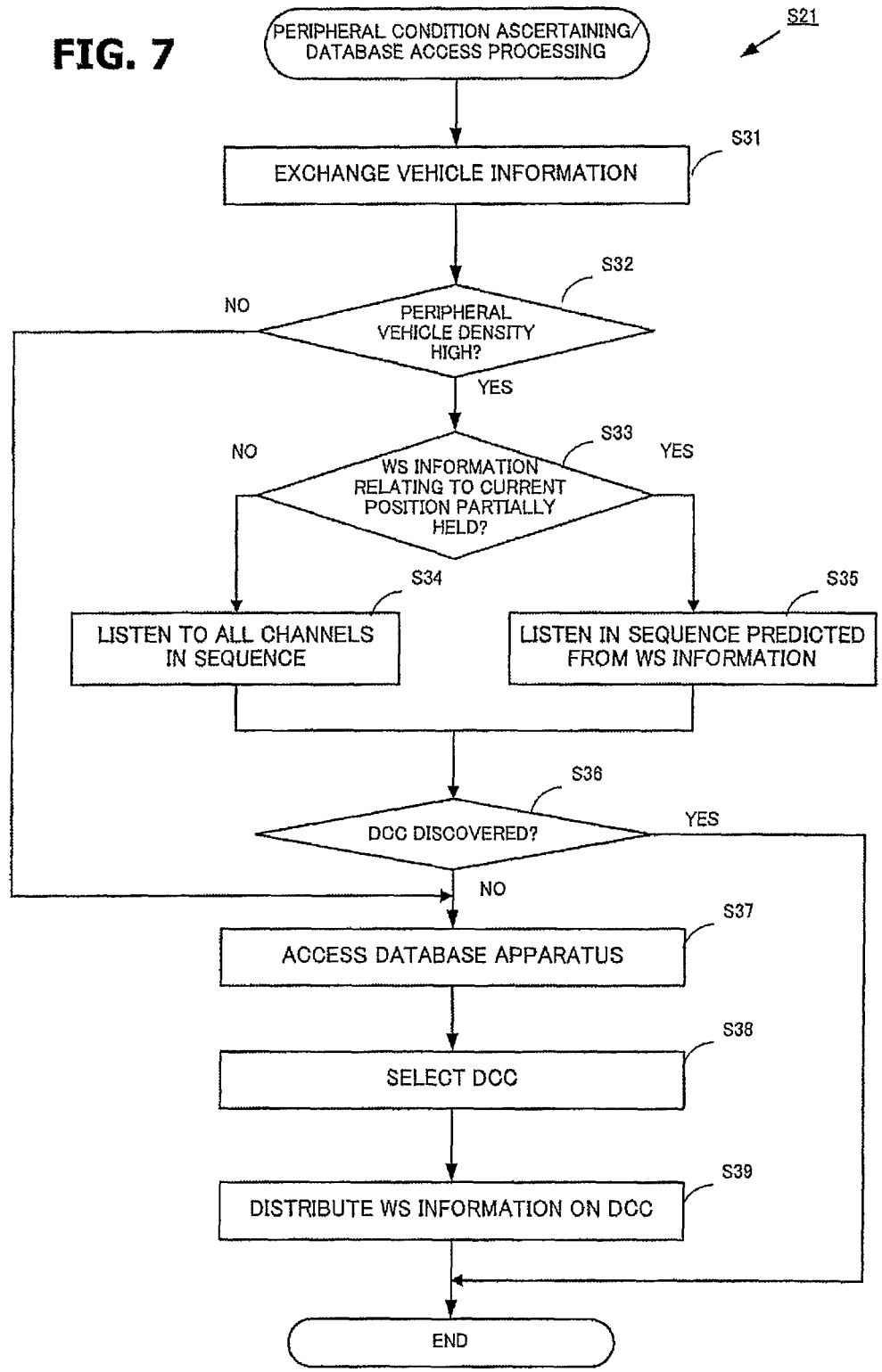
FIG. 7 is a flowchart showing a flow of peripheral condition ascertaining processing/distributed control channel establishment processing according to this embodiment.

The processing for ascertaining the peripheral conditions (S21) and the processing for establishing the distributed control channel (S22) will now be described with reference to a flowchart shown in FIG. 7. Here, we assume a condition where the distributed control channel DCC has not yet been ascertained by the first vehicle, and processing in this situation will be described. A condition in which the distributed control channel DCC has not yet been ascertained arises when the vehicle system is activated (an engine is switched ON) or when movement is performed across DCC sharing areas 42.

The vehicle-to-vehicle communication unit 105 of the first vehicle exchanges vehicle information with the other vehicles (the second vehicles) via the dedicated vehicle-to-vehicle communication channel (S31). As a result, the position information of the peripheral vehicles and information relating to the movement directions and so on thereof can be acquired. As described above, the vehicle information exchange processing is executed repeatedly at period intervals.

Here, a density of the peripheral vehicles can be ascertained from the number of vehicles from which vehicle information is received. Hence, subsequent processing differs depending on the density of the peripheral vehicles. When the peripheral vehicle density equals or exceeds a predetermined threshold (S32—YES), it is likely that the distributed control channel DCC has already been established by the peripheral vehicles, and therefore the first vehicle attempts to discover the distributed control channel DCC by listening. When, at this time, the first vehicle holds no WS information relating to the vicinity of the current position whatsoever (S33—NO), the first vehicle listens to all channels in sequence (S34). When the first vehicle holds a part (or all) of the WS information relating to the vicinity of the current position (S33—YES), on the other hand, the first vehicle can predict the distributed control channel DCC on the basis of the WS information, and therefore the first vehicle listens in order from the channel that is most likely to be in use as the distributed control channel DCC (S35). When the first vehicle is able to discover the distributed control channel DCC by listening (S36—YES), the first vehicle can acquire the WS information via the discovered distributed control channel DCC without performing any further processing. Note that the threshold used in the processing of step S32 may be set within a range of one, to several vehicles.

When the first vehicle is unable to discover the distributed control channel DCC by listening (S36—NO) or when the peripheral vehicle density is low (S32—NO), the first vehicle performs processing to determine the distributed control channel DCC. More specifically, first, the white space DB querying unit 102 of the first vehicle accesses the WSDB 10 via the LTE communication unit 101 in order to acquire the WS information relating to the vicinity of the current position (S37). At this time, the WS information relating at least to the DCC sharing area in which the first vehicle is positioned is acquired. For example, the WS information relating to the DCC sharing area in which the first vehicle is positioned may be requested by including an area ID of the area in the query, or the WS information relating to the DCC sharing area in which the first vehicle is positioned may be requested by including the position IDs (the latitude IDs and the longitude IDs) of two apexes in a diagonal direction of the area in the query. The white space DB querying unit 102 stores the WS information acquired from the WSDB 10 in response in the WS information storage unit 103.

Next, the used frequency determination unit 104 determines the frequency to be used as the distributed control channel DCC on the basis of the WS information relating to the current DCC sharing area, which is stored in the WS information storage unit 103 (S38). As described above, the WS information is information indicating channel use by the primary user in cell units, and a single DCC sharing area includes a plurality of cells. A channel that is in use by the primary user in the smallest proportion of the cells in the DCC sharing area (i.e. the channel having the smallest PU cover ratio), or in other words a channel on which the proportion of cells that can be used by the secondary user is largest, is selected as the distributed control channel DCC.

Once the distributed control channel DCC has been determined, the vehicle-to-vehicle communication unit 105 distributes the WS information stored in the WS information storage unit 103 to the peripheral vehicles on the distributed control channel DCC. The WS information is preferably distributed repeatedly at period intervals, for example.

Next, described with reference to a flowchart shown in FIG. 8 will be processing for distributing the WS information and maintaining the distributed control channel DCC in a condition where the distributed control channel DCC has already been ascertained.

FIG. 8 is a flowchart showing a flow of processing for establishing and maintaining the distributed control channel DCC in a case where the positions of the other vehicles have already been ascertained. First, the vehicle-to-vehicle communication unit 105 of the first vehicle exchanges the vehicle information with the other vehicles (the second vehicles) via the dedicated vehicle-to-vehicle communication channel (S41). As a result, the position information of the peripheral vehicles and the information relating to the movement directions and so on thereof can be acquired. As described above, the vehicle information exchange processing is executed repeatedly at period intervals. Further, the first vehicle acquires information relating to the proxy access area and the DCC sharing area in which it is positioned by acquiring the map information relating to the vicinity of the current position of the first vehicle (S42).

Next, the white space DB querying unit 102 determines whether or not to access the WSDB 10. More specifically, the white space DB querying unit 102 determines whether or not the first vehicle is closer to the center position of the proxy access area than the peripheral vehicles (the second vehicles) (S43). This determination processing may be performed by determining the proxy access area to which the first vehicle belongs, obtaining the center position of the proxy access area to which the first vehicle belongs, calculating respective distances of the peripheral vehicles and the first vehicle to the center position, and determining whether or not the distance of the first vehicle is the shortest distance.

When the first vehicle is not closest to the center position of the proxy access area (S43—NO), the first vehicle terminates the processing without accessing the WSDB 10. In this case, the first vehicle receives the WS information from another vehicle (a second vehicle) on the distributed control channel DCC.

When the first vehicle is closest to the center position of the proxy access area (S43—YES), on the other hand, the white space DB querying unit 102 of the first vehicle accesses the WSDB 10 in order to acquire the WS information. First, the white space DB querying unit 102 generates a query for acquiring the WS information and transmits the generated query to the WSDB 10 (S44). The query preferably requests not only WS information relating to the DCC sharing area to which the first vehicle belongs, but also WS information relating to an expanded area based on the mobility (the movement directions and movement speeds) of the first vehicle and the peripheral vehicles. The white space DB querying unit 102 receives a response transmitted from the WSDB 10 in response to the query, and stores the received response in the WS information storage unit 103 (S45).

Several methods may be considered as methods of determining the expanded area in step S44. These methods will now be described with reference to FIG. 9.

Figure 9A:
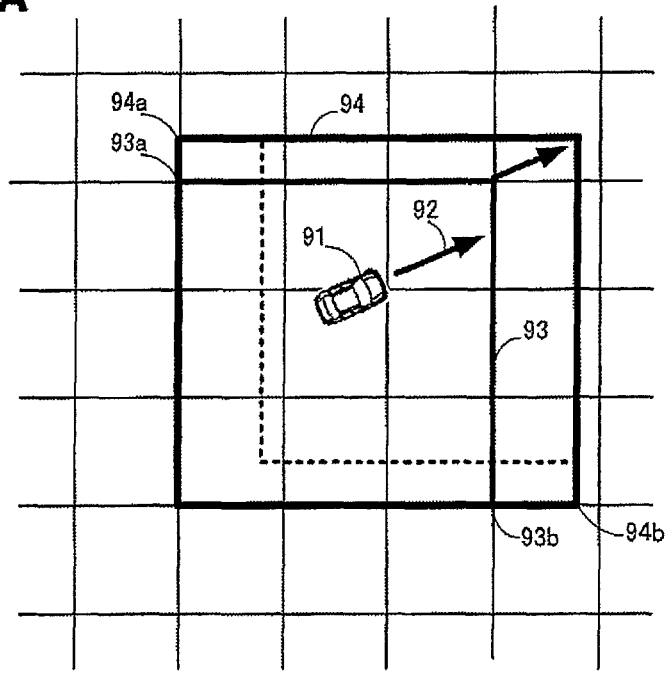
FIGS. 9A to 9C are views illustrating a method of determining an acquisition subject range during the white space information processing according to this embodiment.

FIG. 9A is a view illustrating a method of determining the expanded area on the basis of the mobility of the first vehicle (the vehicle that accesses the WSDB 10). In FIG. 9A, the movement direction and the movement speed of a vehicle 91 are shown as a speed vector 92 (mobility). The DCC sharing area to which the vehicle 91 belongs is a region constituted by a 3×3 proxy access area depicted as a region 93. The white space DB querying unit 102 acquires, from the WSDB 10, WS information relating to an area 94 obtained by expanding the DCC sharing area 93 to which the first vehicle belongs on the basis of the speed vector 92 of the first vehicle.

The query may take any desired form. For example, coordinates (latitude IDs and longitude IDs) of two opposing apexes 93a and 93b of the DCC sharing area 93 may be included in the transmitted query together with the position information and the speed vector 92 of the first vehicle 91. The WSDB 10 may then determine the area 94 obtained by expanding the DCC sharing area 93 on the basis of the information included in the query, and return the WS information relating to the area 94.

Alternatively, the area 94 may be determined on the vehicle side so that two opposing apexes 94a and 94b of the area 94 are included in the transmitted query.

Figure 9B:
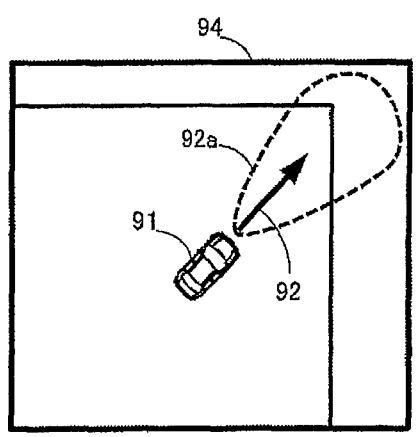

As shown in FIG. 9B, the expanded area 94 may be determined such that the expanded area 94 includes the DCC sharing area 93 and a predicted movement range 92a obtained from the position information and the speed vector 92 of the vehicle 91.

Furthermore, the expanded area 94 is preferably determined in consideration of not only the mobility of the first vehicle, but also the positions and mobility of the peripheral vehicles (the vehicles positioned in the same proxy access area).

Figure 9C:
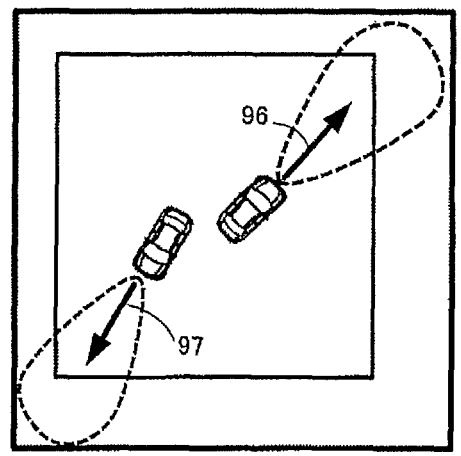

FIG. 9C is a view illustrating another example of a method of determining the expanded area, taking into consideration the position information and movement vectors of the first vehicle and a second vehicle (a peripheral vehicle positioned in the same DCC sharing area). In this example, the expanded area is determined on the basis of the respective movement vectors of the first vehicle and the second vehicle. For example, when vehicles having mobility indicated by an arrow 96 and an arrow 97 exist, the expanded area is determined in consideration of the respective mobility thereof.

Note that the reason for setting the expanded area on the basis of the mobility as well as the DCC sharing area is to ensure that when the first vehicle and the second vehicle move to a different DCC sharing area from the current DCC sharing area, the peripheral WS information is acquired in advance. Therefore, the method of determining the expanded area is not limited to the method described above, and the method may be amended in various ways as long as this object is achieved.

The WS information transmitted from the WSDB 10 in response to the query includes, for example, information specifying start point and end point cells of the WS information acquisition subject range (the latitude IDs and longitude IDs of the start point and the end point), and data indicating channel use by the primary user in relation to all of the channels in all of the cells in the subject range.

Next, the used frequency determination unit 104 determines the frequency to be used as the distributed control channel DCC on the basis of the WS information relating to the current DCC sharing area, which is stored in the WS information storage unit 103 (S45). As described above, the WS information is information indicating channel use by the primary user in cell units, and a plurality of cells are included in a single DCC sharing area. The channel that is in use by the primary user in the smallest proportion of the cells in the DCC sharing area (i.e. the channel having the smallest PU cover ratio), or in other words the channel on which the proportion of cells that can be used by the secondary user is largest, is selected as the distributed control channel DCC.

FIG. 10 is a view illustrating processing for selecting the distributed control channel DCC. Here, the DCC sharing area is described as being constituted by 4×4 cells, but in actuality the DCC sharing area includes a large number of cells. In FIG. 10, WS information relating to three channels (Channels 0, 1, and 2) is shown. Circles indicate that a channel is not in use by the primary user (i.e. that the channel is available), and crosses indicate that a channel is in use by the primary user. The PU cover ratio is defined as (number of cells in use by primary user)/(total number of cells), and in the example of FIG. 10, the PU cover ratios of Channels 0, 1, and 2 are 25%, 50%, and 6%, respectively. In this example, therefore, Channel 2, which has the lowest PU cover ratio, is selected as the distributed control channel DCC. Note that when a plurality of channels have an identical PU cover ratio minimum value, one of the channels is preferably selected using a predetermined criterion (for example, the channel having the lowest frequency or the like is selected), so that the same channel can always be selected from the same WS information.

Note that all of the cells are treated equally when calculating the PU cover ratio in the above explanation, but instead, the PU cover ratio may be calculated after weighting the cells in accordance with the number of vehicles existing in each cell and a number of vehicles predicted to exist in each cell in the future. In so doing, a channel that can be used by a larger number of vehicles can be selected as the distributed control channel DCC.

Once the distributed control channel DCC has been determined, the vehicle-to-vehicle communication unit 105 distributes the WS information stored in the WS information storage unit 103 to the peripheral vehicles on the distributed control channel DCC (S46). The WS information is preferably distributed repeatedly at period intervals, for example.

Accessing the WSDB 10 and determining the distributed control channel DCC through the processing described above has the following advantages. First, the number of vehicles accessing the WSDB 10 is basically one per proxy access area, and therefore a processing load on the WSDB 10 can be lightened and a volume of communication on the LTE communication network can be suppressed. Further, by selecting the channel having the lowest PU cover ratio as the distributed control channel DCC, a channel that can be used by a larger number of vehicles can be selected. Moreover, the same channel is selected even when a plurality of vehicles determine the distributed control channel DCC, and therefore the same channel is selected as the distributed control channel DCC within the DCC sharing area.

Figure 11:
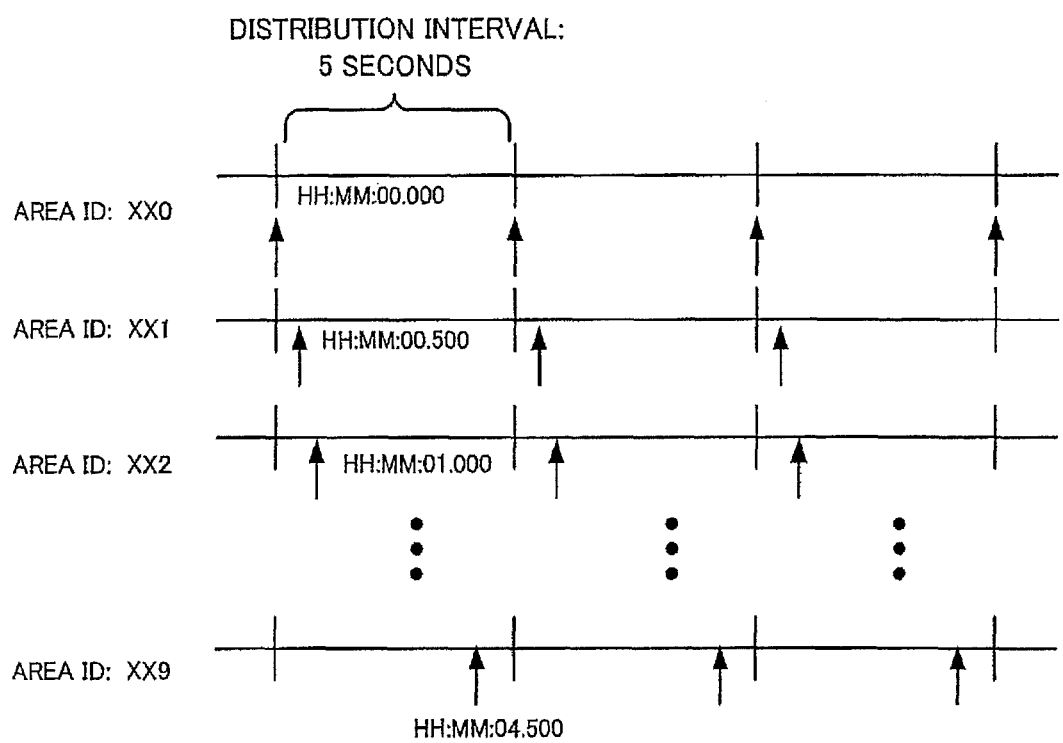
FIG. 11 is a view illustrating processing timings of database access processing and white space information distribution processing according to this embodiment.

The WS information distribution processing and distributed control channel DCC maintenance processing illustrated in the flowchart of FIG. 8 are preferably performed periodically. As shown in FIG. 11, for example, an execution interval of the processing is set to be identical (five seconds, for example) in all proxy access areas. However, the execution timing is preferably shifted in accordance with the proxy access area. In the example of FIG. 11, the execution timing is shifted by 0.5 seconds in accordance with a value (a remainder following division by 10) at the end of the proxy access area ID. In so doing, simultaneous access to the WSDB 10 can be reduced. Note that in the example of FIG. 11, the proxy access area is divided into ten groups, and the execution timing is varied in each group. However, the number of groups may be increased or reduced.

[Group Control Channel GCC Establishment/Maintenance Processing]

Next, the processing for establishing and maintaining the group control channel GCC (S23) will be described with reference to a flowchart shown in FIG. 12. Note that here, it is assumed that the first vehicle has already acquired the peripheral WS information either directly from the WSDB 10 or via the distributed control channel DCC.

Processing for exchanging the vehicle information via the dedicated vehicle-to-vehicle communication channel is performed periodically so that each vehicle can acquire the position information, movement information, and so on of the peripheral vehicles (S61). The first vehicle then specifies vehicles belonging to the same group (vehicle group) on the basis of the positions and mobility (movement directions and movement speeds) of the first vehicle and the peripheral vehicles (the second vehicles) (562). Vehicles moving in a similar movement direction, among nearby vehicles, may be specified as members of the vehicle group. Alternatively, vehicles traveling along an identical road in an identical direction, among the nearby vehicles, may be specified as the members of the vehicle group.

Once the members of the vehicle group have been specified, the first vehicle determines whether or not the first vehicle itself satisfies a condition as a leader of the vehicle group (S63). Any condition may be employed to determine the leader vehicle. For example, the leading vehicle of the vehicle group may be set as the leader vehicle, or the vehicle having the smallest or largest vehicle ID in the vehicle group may be set as the leader vehicle. Needless to mention, the leader vehicle may be selected in accordance with another criterion.

When the first vehicle is the leader vehicle (S63—YES), the first vehicle selects the group control channel GCC on the basis of the peripheral WS information (S64). Processing for selecting the group control channel GCC will now be described in detail with reference to FIGS. 13 and 14.

FIG. 13A is a flowchart showing in detail the processing S64 for selecting the group control channel GCC. First, a road on which the first vehicle (and the vehicle group) is traveling is specified from the movement direction of the first vehicle and the map information (S641). A predicted movement area is then specified on the basis of a shape of the travel road (S642). The channel having the lowest PU cover ratio in the predicted movement area is then selected as the group control channel GCC (S643).

As shown in FIG. 13B, for example, when a first vehicle (or a vehicle group) 1301 is traveling on a road 1302 in a rightward direction of the drawing, a region denoted as an area 1303 may be determined to be the next predicted movement area. Note that the area 1303 is a region formed from a combination of cells. As shown in FIG. 13C, the PU cover ratio of the entire predicted movement area is calculated for each channel by determining PU use in relation to each of the cells in the predicted movement area. In this example, Ch1 has a PU cover ratio of 6% and Ch2 has a PU cover ratio of 50%, and therefore Ch1 is selected as the group control channel GCC.

Figure 14A:
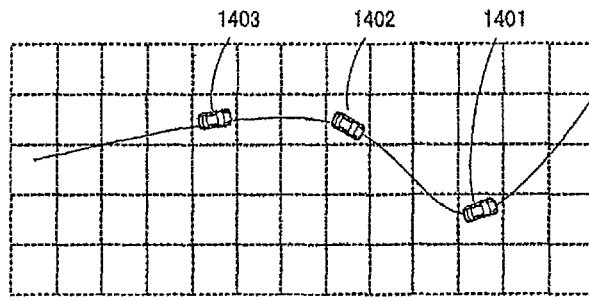
FIGS. 14A to 14E are views illustrating the group control channel selection processing according to this embodiment.
Figure 14B:
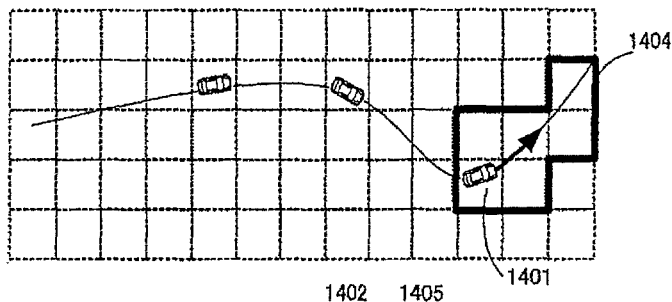
Figure 14C:
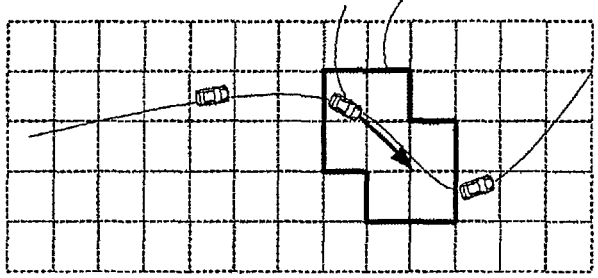
Figure 14D:
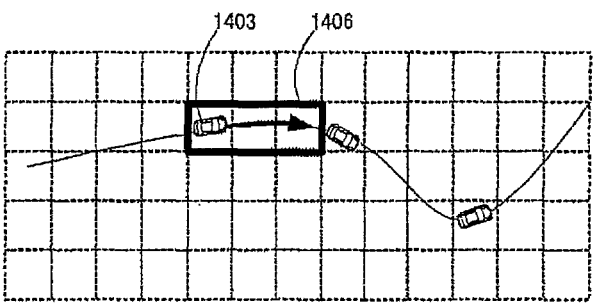
Figure 14E:
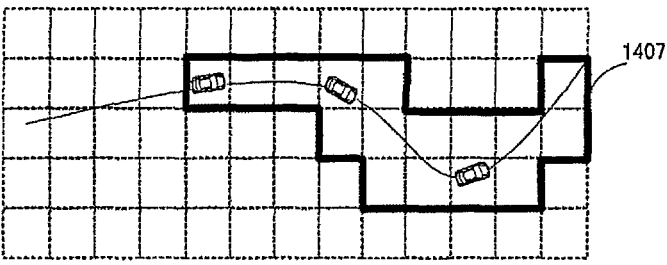

The predicted movement area may be calculated using a different method. For example, a predicted movement range may be determined for each of the vehicles constituting the vehicle group, and a range obtained by adding together the determined predicted movement ranges may be set as the predicted movement area of the vehicle group. This method will now be described with reference to FIG. 14. As shown in FIG. 14A, for example, the vehicle group is assumed to be constituted by three vehicles 1401 to 1403. A range 1404 in which the vehicle 1401 is positioned from a current time to a predetermined time in the future can be estimated on the basis of the position of the vehicle 1401, the shape of the road in that position, the movement speed, and so on (FIG. 14B). Predicted movement ranges 1405 and 1406 can be estimated similarly for the vehicles 1402 and 1403 (FIGS. 14C and 14D). A range 1407 obtained by adding together the ranges 1404 to 1406 can then be determined as the predicted movement area of the vehicle group (FIG. 14E). In so doing, only the cells in which vehicles exist are extracted in order to determine the PU cover ratio, and as a result, a more favorable channel can be selected. This method can be said to be particularly effective when the size of the cell is small in comparison with the size of the vehicle group.

After determining the group control channel GCC, the leader vehicle notifies the vehicles in the same group of the selected channel on the distributed control channel DCC (S65). The vehicles other than the leader vehicle can ascertain the group control channel GCC from this notification, and can thereafter communicate using the group control channel GCC. On the group control channel GCC, routing information is exchanged within the vehicle group, notice of the data channel is given, and so on.

Figure 12:
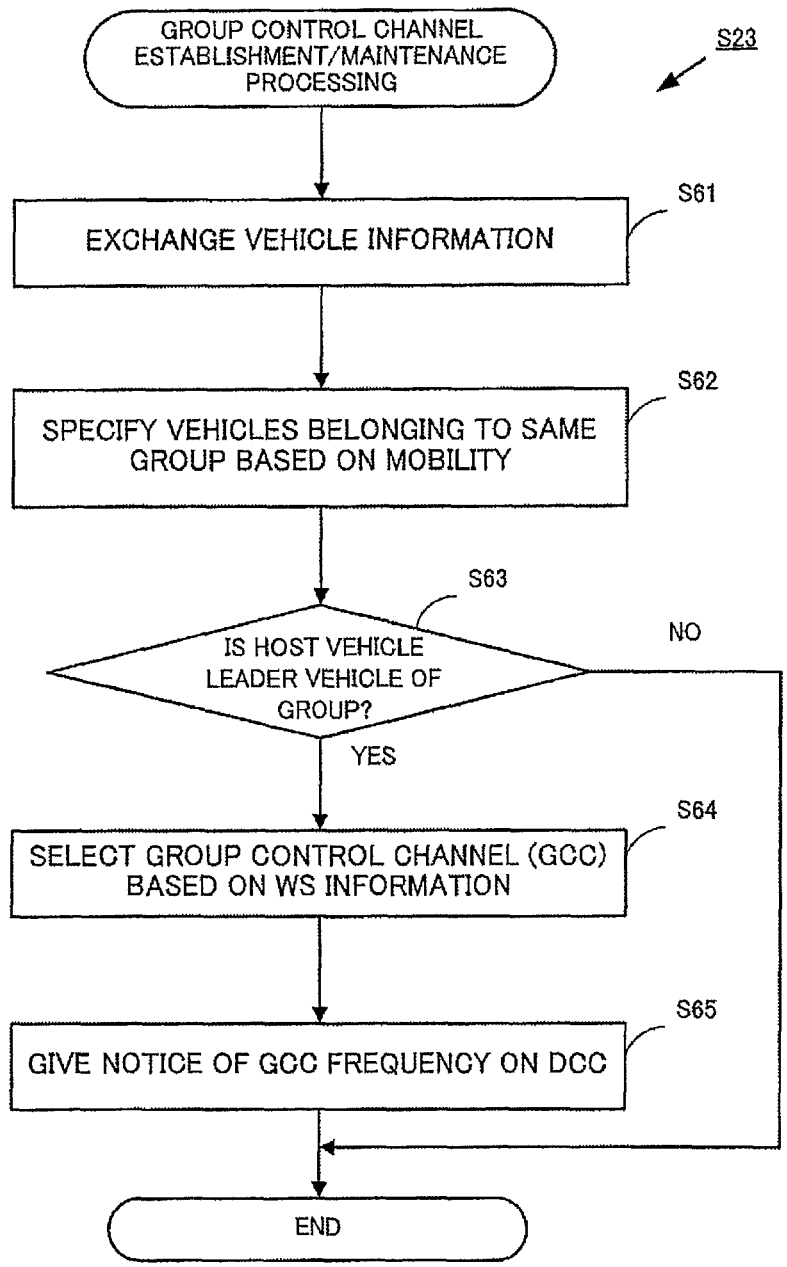
FIG. 12 is a flowchart showing a flow of group control channel establishment/maintenance processing according to this embodiment.

The group control channel GCC establishment/maintenance processing shown in FIG. 12 is preferably executed repeatedly. For example, the processing may be executed periodically at five second intervals or the like. Further, the processing is preferably repeated when the travel road changes. Furthermore, the processing is preferably repeated following movement into a different DCC sharing area, even when the travel road remains the same.

[Data Channel Establishment/Maintenance Processing]

Next, the data channel DCH establishment/maintenance processing (S24) will be described. Note that here, it is assumed that the vehicles have already acquired the peripheral WS information either directly from the WSDB 10 or via the distributed control channel DCC, and that group formation has been completed and the vehicles have been informed of the group control channel GCC.

The data channel selection/maintenance processing is executed by the leader vehicle of the group. The criterion on which to select the leader vehicle has already been described above, and therefore repeated description thereof has been omitted. In the data channel selection/maintenance processing, the predicted movement area of each vehicle in the group is calculated at time step intervals (five second intervals, for example) so that a channel that can be used by all vehicles at the current time and that can be used continuously thereafter for the longest time is selected as the data channel. This processing will now be described in detail with reference to FIGS. 15 to 17.

Figure 15:
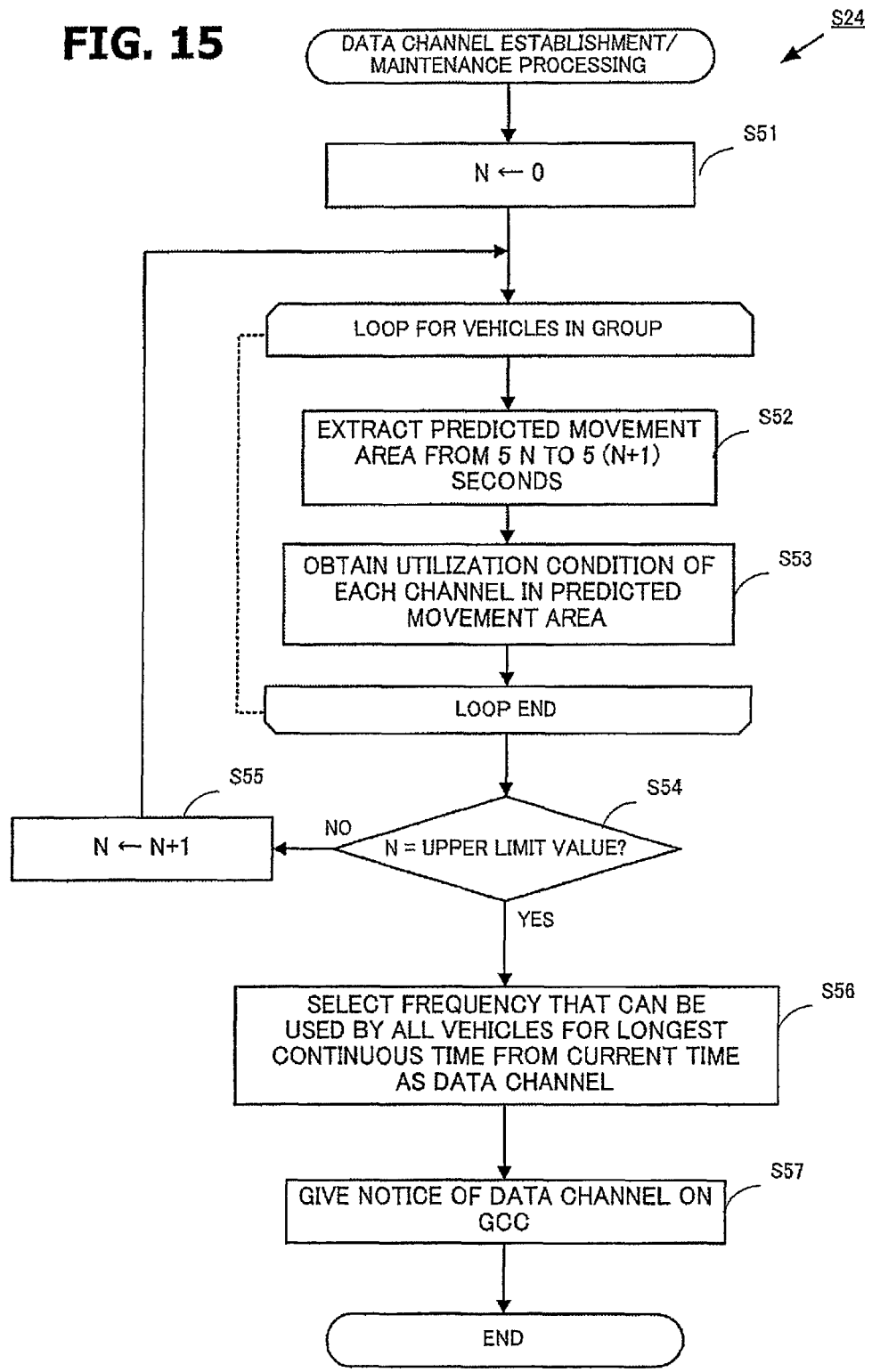
FIG. 15 is a flowchart showing a flow of data channel establishment/maintenance processing according to this embodiment.

FIG. 15 is a flowchart showing a flow of the data channel selection/maintenance processing. First, a variable N representing the time step is initialized to 0 (S51). Here, a period of five seconds is envisaged as the time step, and therefore the time step N represents a period of 5 N seconds to 5 (N+1) seconds after the current time.

Processing of steps S52 to S53 is executed repeatedly for each vehicle. In step S52, the predicted movement area of the subject vehicle during the time step N, or in other words from 5 N seconds to 5 (N+1) seconds after the current time, is extracted. In step S53, the utilization condition of the primary user with regard to each channel in the calculated predicted movement area is obtained.

This processing is repeated until the time step N reaches an upper limit value. The upper limit value of N is set at "8", for example, such that the utilization condition of the primary user is obtained in relation to the predicted movement area up to 45 seconds after the current time.

Figure 16A:
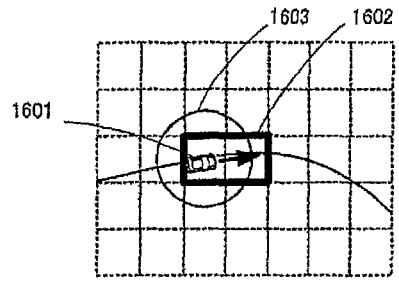
FIGS. 16A to 16D are views illustrating data channel selection processing according to this embodiment.

The above processing will now be described more specifically with reference to FIG. 16. FIG. 16A shows the position of a vehicle 1601 at the current time, and a predicted movement area 1602 from 0 to 5 seconds thereafter. The predicted movement area 1602 is determined as follows. First, a range 1603 in which movement is possible between 0 and 5 seconds after the current time is determined on the basis of the movement speed. Next, an overlapping part between the range 1603 and an advancement direction side part of the current travel road is determined as the predicted movement area 1602. Here, two cells are extracted as the predicted movement area 1602. The utilization condition of each channel in the respective cells of the predicted movement area 1602 is then obtained on the basis of the WS information. In the example of FIG. 16A, Channel 1 can be used in both of the two cells, whereas in an example shown in FIG. 16B, Channel 2 can be used in one of the two cells but not in the other.

Figure 16B:
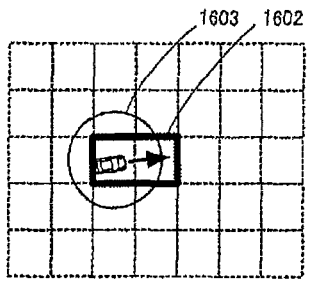
Figure 16C:
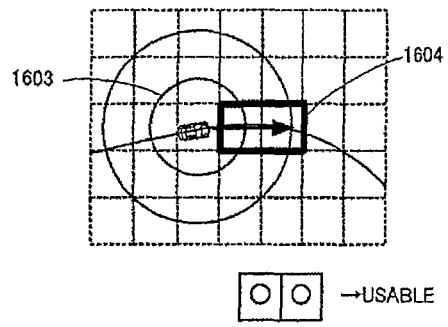
Figure 16D:
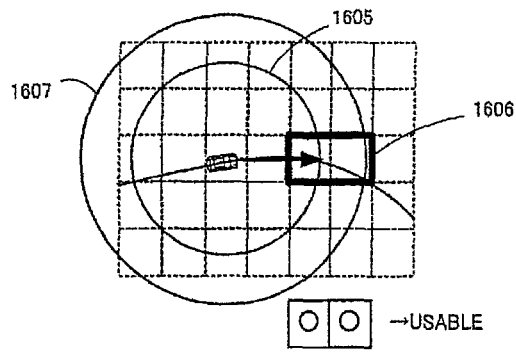

FIG. 16C shows a predicted movement area 1604 between 5 and 10 seconds after the current time. A range in which movement is possible between 5 and 10 seconds after the current time is determined in a similar manner to that described above, whereupon an overlapping part between the range and the advancement direction side part of the current travel road is determined as the predicted movement area 1604. Note that the range in which movement is possible between 5 and 10 seconds after the current time is set as an outer side part of the range 1603 in which movement is possible up to 5 seconds after the current time and an inner side part of a range 1605 in which movement is possible up to 10 seconds after the current time. In other words, the predicted movement area is determined on the assumption that the vehicle will travel along the road in the same direction and at a constant speed. After determining the predicted movement area between 5 and 10 seconds after the current time in the manner described above, the utilization condition of each channel in the respective cells included in the area is obtained. FIG. 16D shows a predicted movement area 1606 between 10 and 15 seconds after the current time. The processing performed in relation to this area is similar to that described above, and therefore description thereof has been omitted.

By completing the repeated processing described above, predicted movement areas can be extracted and the utilization conditions of the respective channels in the areas can be obtained in relation to all of the vehicles and all of the time steps. The data channel must be usable by all of the vehicles, and therefore a channel that can be used in all of the cells of the predicted movement areas of all of the vehicles in a certain time step is determined to be usable as the data channel, while all other channels are determined to be unusable. In the examples of FIGS. 16A and 16B, for example, Channel 1 is determined to be usable (as long as Channel 1 can be used by the other vehicles) and Channel 2 is determined to be unusable (even when Channel 2 can be used by the other vehicles) between 0 and 5 seconds after the current time.

Figure 17:
FIG. 17 is a view illustrating the data channel selection processing according to this embodiment.

In other words, upon completion of the repeated processing described above, as shown in FIG. 17, it is possible to determine whether or not the respective channels can be used in each time step. The leader vehicle selects the channel that can be used by all of the vehicles for the longest continuous time from the current time as the data channel (S56). In the example of FIG. 17, Channel 1 can be used by all of the vehicles for six steps from the current time, which is a longer usable time than the zero time steps of Channel 2, the five steps of Channel 3, and the four steps of Channel 4. Hence, the leader vehicle sets Channel 1 as the data channel.

When a plurality of channels have the longest continuous time, a channel may be selected from these channels at random. Furthermore, channel bonding, in which a plurality of channels are used as the data channel, may be employed, whereby redundancy during communication and an improvement in throughput are achieved.

In the example described above, the predicted movement areas of the respective vehicles are determined at time step intervals (between 0 and 5 seconds after the current time, between 5 and 10 seconds after the current time, and so on, for example), but the predicted movement areas may be determined at distance intervals. For example, a predicted movement area between 0 and 100 m from the current position of each vehicle, a predicted movement area between 100 and 200 m from the current position of each vehicle, and so on May be determined. In this case, a channel that can be used by all of the vehicles for the greatest distance may be selected as the data channel. In other words, the utilization conditions of the channels may be determined using either a time criterion or a distance criterion.

The vehicles in the group are notified of the determined data channel on the group control channel GCC (S57). The data channel is then used by an application program (a formation travel application program or the like, for example) that uses vehicle-to-vehicle communication to transmit data.

[Actions and Effects of the Embodiment]

According to this embodiment, instead of having all of the vehicles access the white space database apparatus, a single vehicle within the proxy access area accesses the database apparatus as a proxy and distributes the acquired white space information over a control channel established in white space. As a result, concentrated access to the database apparatus can be avoided. Furthermore, a situation in which communication with the database apparatus over an LTE communication network or the like becomes congested can be avoided.

Further, when the database apparatus is accessed, the white space information relating to the DCC sharing area is acquired, and the distributed control channel DCC is determined in accordance with the utilization condition of the primary user within this area. Hence, the channel having the largest usable area (the largest number of usable cells) within the DCC sharing area can be selected as the distributed control channel DCC. Moreover, since the distributed control channel DCC is selected using this criterion, the same channel is selected as the distributed control channel DCC in the DCC sharing area, thereby eliminating the need to switch the distributed control channel DCC frequently.

Furthermore, the group control channel GCC and the data channel DCH are determined appropriately on the basis of the white space information distributed on the distributed control channel DCC determined in the manner described above, and therefore highly usable channels can be selected as the group control channel GCC and the data channel DCH.

MODIFIED EXAMPLES

An example of the present invention was described above, but the present invention is not limited to this example, and various modifications may be performed thereon within the scope of the technical conception of the invention.

For example, parameters such as distance and time in the above description may be modified as desired. For example, the sizes of the proxy access area, the DCC sharing area, frequency band, and so on may be modified as desired in accordance with system requirements. Further, the time serving as the interval at which the database apparatus is accessed may be modified as desired in accordance with system requirements.

Moreover, in the above description, only the vehicle that is closest to the center position of the proxy access area accesses the white space database apparatus, but a plurality of vehicles close to the center position may access the database apparatus. Alternatively, a plurality of reference positions may be provided in the proxy access area, and the vehicles closest to the respective reference positions may access the database apparatus. In other words, as long as a limitation is applied in accordance with a certain criterion such that only a part of the vehicles accesses the database apparatus, the effects of reducing concentrated access to the database apparatus and reducing communication traffic are obtained.

Furthermore, when the vehicle acquires the white space information from the database apparatus, the subject area may be determined by one of the vehicle and the database apparatus or by both cooperatively. For example, the start point and end point of the subject area may be calculated on the vehicle side on the basis of the current position, the movement vector, and so on, and this information may be included in the transmitted query. Conversely, the vehicle may include the current position, the movement vector, and so on in the transmitted query, and the subject area may be calculated in the database apparatus on the basis of this information. The methods described in the above embodiment are merely examples, and various other methods may be employed.

What is claimed is:

1. A wireless communication method implemented by a first in-vehicle wireless communication apparatus constituting a vehicle-to-vehicle communication system, comprising:
    a position information acquisition step of acquiring position information relating to the first in-vehicle wireless communication apparatus;
    a vehicle data transmission step of transmitting vehicle data including the position information via a predetermined control channel;
    a vehicle data reception step of receiving vehicle data transmitted on the control channel from a second in-vehicle wireless communication apparatus;
    a map information acquisition step of acquiring, from a map information storage unit configured to store map information divided into a plurality of first areas, information relating to a first area including a current position of the first in-vehicle wireless communication apparatus;
    a determination step of determining whether or not to access a database apparatus storing white space information on the basis of the position information of the first in-vehicle wireless communication apparatus, acquired in the position information acquisition step, the position information of the second in-vehicle wireless communication apparatus, acquired in the vehicle data reception step, and the information relating to the first area, acquired in the map information acquisition step;
    a querying step of acquiring white space information relating to a vicinity of the current position from the database apparatus after determining to access the database apparatus in the determination step; and
    a distribution step of transmitting the white space information acquired from the database apparatus in the querying step to a peripheral in-vehicle wireless communication apparatus.

2. The wireless communication method according to claim 1, wherein, when the first in-vehicle wireless communication apparatus is closer than the second in-vehicle wireless communication apparatus to a predetermined position defined within the first area including the current position, the first in-vehicle wireless communication apparatus is determined as an apparatus that accesses the database apparatus in the determination step.

3. The wireless communication method according to claim 2, wherein the predetermined position is a center position of the first area.

4. The wireless communication method according to claim 1, wherein the map information stored in the map information storage unit is also divided into second areas that are larger than the first areas, and
    in the querying step, white space information relating to a second area including the current position is acquired from the database apparatus.

5. The wireless communication method according to claim 4, wherein the vehicle data include position information, a movement direction, and a movement speed, and
    in the querying step, white space information relating to an area obtained by expanding the second area including the current position on the basis of the movement direction and the movement speed of at least one of the first in-vehicle wireless communication apparatus and the second in-vehicle wireless communication apparatus is acquired from the database apparatus.

6. The wireless communication method according to claim 1, wherein the white space information is constituted by data indicating use by a primary user in units of cells, which are smaller regions than the first areas.

7. The wireless communication method according to claim 1, wherein the determination step, the querying step, and the distribution step are executed at a timing that is determined according to the first area including the current position.

8. The wireless communication method according to claim 1, further comprising a first dynamic control channel determination step of determining a frequency to be used as a first dynamic control channel from among usable frequencies on the basis of the white space information relating to the vicinity of the current position, acquired in the querying step,
    wherein, in the distribution step, the white space information acquired from the database apparatus is transmitted to the peripheral in-vehicle wireless communication apparatus using the first dynamic control channel.

9. The wireless communication method according to claim 8, wherein the map information stored in the map information storage unit is also divided into second areas that are larger than the first areas, and
    in the first dynamic control channel determination step, a most usable frequency within a second area including the current position is determined as the frequency to be used as the first dynamic control channel.

10. The wireless communication method according to claim 8, wherein the vehicle data include position information, a movement direction, and a movement speed, and
    the wireless communication method further comprises:
    a group determination step of determining an in-vehicle wireless communication apparatus that belongs to an identical group to the first in-vehicle wireless communication apparatus on the basis of the position information, the movement directions, and the movement speeds of the first in-vehicle wireless communication apparatus and the second in-vehicle wireless communication apparatus;
    a step of determining whether or not the first in-vehicle wireless communication apparatus is a leader of the group;
    a second dynamic control channel determination step of determining a frequency to be used as a second dynamic control channel in the group when the first in-vehicle wireless communication apparatus is the leader of the group; and
    a second dynamic control channel notification step of notifying the peripheral in-vehicle wireless communication apparatus of the frequency of the second dynamic control channel using the first dynamic control channel.

11. The wireless communication method according to claim 10, wherein, in the second dynamic control channel determination step, an existence range of each in-vehicle wireless communication apparatus in the group from a current time to a predetermined time after the current time is predicted on the basis of the position information, the movement directions, and the movement speeds of the in-vehicle wireless communication apparatuses in the group, and a frequency that is used least frequently by the primary user over an entire predicted range of each in-vehicle wireless communication apparatus is determined as the frequency to be used as the second dynamic control channel.

12. The wireless communication method according to claim 10, further comprising:

a data channel determination step of determining a frequency to be used as a data channel in the group when the first in-vehicle wireless communication apparatus is the leader of the group; and a data channel notification step of notifying the peripheral in-vehicle wireless communication apparatus of the frequency of the data channel using the second dynamic control channel.

13. The wireless communication method according to claim 12, wherein, in the data channel determination step, an existence range corresponding to the passage of time is estimated in relation to each of the in-vehicle wireless communication apparatuses in the group, and a frequency that can be used continuously for a longest time by all of the in-vehicle wireless communication apparatuses in the group is determined as the data channel.

14. A non-transitory computer-readable medium storing a program that causes a computer to execute the respective steps of the wireless communication method according to claim 1.

15. An in-vehicle wireless communication apparatus comprising:

a position information acquisition unit configured to acquire position information relating to the first in-vehicle wireless communication apparatus;

a vehicle data transmission unit configured to transmit vehicle data including the position information via a predetermined control channel;

a vehicle data reception unit configured to receive vehicle data transmitted on the control channel from a second in-vehicle wireless communication apparatus;

a map information acquisition unit configured to acquire, from a map information storage unit configured to store map information divided into a plurality of first areas, information relating to a first area including a current position of the first in-vehicle wireless communication apparatus;

a determination unit configured to determine whether or not to access a database apparatus storing white space information on the basis of the position information of the first in-vehicle wireless communication apparatus, acquired by the position information acquisition unit, the position information of the second in-vehicle wireless communication apparatus, acquired by the vehicle data reception unit, and the information relating to the first area, acquired by the map information acquisition unit;

a querying unit configured to acquire white space information relating to a vicinity of the current position from the database apparatus when the determination unit determines to access the database apparatus; and a distribution unit configured to transmit the white space information acquired by the querying unit from the database apparatus to a peripheral in-vehicle wireless communication apparatus.

* * * * *